(12) United States Patent
Hawker et al.

(10) Patent No.: US 8,153,729 B2
(45) Date of Patent: Apr. 10, 2012

(54) HIGHLY EFFICIENT AGENTS FOR DISPERSION OF NANOPARTICLES IN MATRIX MATERIALS

(75) Inventors: Craig J. Hawker, Santa Barbara, CA (US); Robert Vestberg, Stockholm (SE); Nobuhiko Ueno, Tokyo (JP)

(73) Assignees: The Regents of the University of California, Oakland, CA (US); Mitsubishi Chemical Corporation, Tokyo (JP)

( * ) Notice: Subject to any disclaimer, the term of this patent is extended or adjusted under 35 U.S.C. 154(b) by 953 days.

(21) Appl. No.: 12/156,035

(22) Filed: May 29, 2008

(65) Prior Publication Data

US 2009/0299003 A1 Dec. 3, 2009

(51) Int. Cl.
*C08F 8/00* (2006.01)
(52) U.S. Cl. ........ 525/192; 525/194; 525/305; 525/306; 525/309; 525/314; 525/424; 525/432; 525/437
(58) Field of Classification Search .................. 525/192, 525/194, 305, 306, 309, 314, 424, 432, 437
See application file for complete search history.

(56) References Cited

U.S. PATENT DOCUMENTS

| | | | |
|---|---|---|---|
| 6,020,457 A | 2/2000 | Klimash et al. | |
| 6,444,758 B2 * | 9/2002 | McNamara et al. | 525/302 |
| 6,617,397 B2 * | 9/2003 | McNamara et al. | 525/302 |
| 7,642,320 B2 * | 1/2010 | McNamara et al. | 525/192 |
| 2006/0241194 A1 | 10/2006 | Cha et al. | |
| 2007/0231744 A1 | 10/2007 | Sasao et al. | |
| 2007/0298006 A1 | 12/2007 | Tomalia et al. | |
| 2007/0299221 A1 | 12/2007 | Perrier | |

OTHER PUBLICATIONS

Leduc, M. R.; Hawker, C. J.; Dao, J.; Fréchet, J. M. J. J. Am. Chem. Soc. 1996, 118, 11111-11118.
van Duijvenbode, R. C.; Koper, G. J. M.; Boehmer, M. R. Langmuir 2000, 16, 7713-7719.
Pathak, S.; Singh Anup, K.; McElhanon James, R.; Dentinger Paul, M. Langmuir 2004, 20, 6075-6079.
McCain, K. S.; Schluesche, P.; Harris, J. M. Anal. Chem. 2004, 76, 930-938.
Grohn, F.; Gu, X.; Gruell, H.; Meredith, J. C.; Nisato, G.; Bauer, B. J.; Karim, A.; Amis, E. J. Macromolecules 2002, 35, 4852-4854.
Fréchet, J. M. J.; Gitsov, I.; Monteil, T.; Rochat, S.; Sassi, J.-F.; Vergelati, C.; Yu, D. Chem. Mater. 1999, 11, 1267-1274.
Malkoch, M.; Malmström, E.; Hult, A. Macromolecules 2002, 35, 8307-8314.
Perrier, S.; Takolpuckdee, P. J. Polym. Sci., Part A: Polym. Chem. 2005, 43, 5347-5393.
Perrier, S.; Takolpuckdee, P.; Westwood, J.; Lewis, D. M. Macromolecules 2004, 37, 2709-2717.
Ihre, H.; Hult, A.; Fréchet, J. M. J.; Gitsov, I. Macromolecules 1998, 31, 4061-4068.
Williams, R. H.; Hamilton, L. A. J. Am. Chem. Soc. 1952, 74, 5418-5420.
Skaff, H.; Emrick, T. Angew. Chem., Int. Ed. 2004, 43, 5383-5386.
Rostovtsev, V. V.; Green, L. G.; Fokin, V. V.; Sharpless, K. B. Angew. Chem., Int. Ed. 2002, 41, 2596-2599.
Malkoch, M.; Schleicher, K.; Drockenmuller, E.; Hawker, C. J.; Russell, T. P.; Wu, P.; Fokin, V. V. Macromolecules 2005, 38, 3663-3678.
Lee Lac, V.; Mitchell Michael, L.; Huang, S.-J.; Fokin Valery, V.; Sharpless, K. B.; Wong, C.-H. J. Am. Chem. Soc. 2003, 125, 9588-9589.
Turkevich, J.; Stevenson, P. C.; Hillier, J. Discussions of the Faraday Society 1951, No. 11, 55-75.
Zheng, N.; Fan, J.; Stucky, G. D. J. Am. Chem. Soc. 2006, 128, 6550-6551.
Gujadhur, R.; Venkataraman, D.; Kintigh, J. T. Tetrahedron Lett. 2001, 42, 4791-4793.
Moore, J. S.; Stupp, S. I. Macromolecules 1990, 23, 65-70.
Khoukhi, N.; Vaultier, M.; Carrie, R. Tetrahedron 1987, 43, 1811-1822.

* cited by examiner

*Primary Examiner* — Bernard Lipman
(74) *Attorney, Agent, or Firm* — Berliner & Associates

(57) ABSTRACT

Dendritic macroinitiator compositions are provided comprising a compound of the general formula, Fx-[G-n]-I, where F is the chain end functional group of the dendrimer, x is the number of chain end functional groups, G is the dendrimer, n is the generation number of the dendrimer, and I is the initiating group. Hybrid dendritic-linear copolymers made from these macroinitators can act as highly efficient dispersing agents for a range of nanoparticles in matrix materials.

10 Claims, 18 Drawing Sheets

HIGHLY EFFICIENT AGENTS FOR DISPERSION OF NANOPARTICLES IN MATRIX MATERIALS

FIELD OF THE INVENTION

The present invention relates to dispersing agents. More particularly, this invention relates to modular library of hybrid dendritic-linear copolymers that can act as highly efficient dispersing agents for a range of nanoparticles in matrix materials.

BACKGROUND OF THE INVENTION

The efficient dispersion of nanoparticles in matrix materials is becoming a critical aspect of many emerging technologies and the development of a general strategy for enhancing and maximizing the efficiency of dispersion will offer a significant advantage for a variety of academic and industrial applications. For example, the thermomechanical responses of polymers, which can provide limitations to their practical use, are favorably altered by the addition of trace amounts of nanoparticles. Similarly, addition of high refractive nanoparticles to polymeric materials can lead to a dramatic increase in the refractive index of the overall nanocomposite. In both cases, the level and utility of property enhancement is directly related to the degree of dispersion for the nanoparticle. Non uniform dispersion leading to nanoparticle aggregation is undesirable as it result in property degradation such as opacity for optical nanocomposites. Traditional approaches to nanoparticle dispersion involve the use of either small molecule ligands/surfactants or functionalized polymers such as block copolymers. However a number of challenges exist with these dispersing agents. For small molecule derivatives, low dispersion efficiency is often obtained due to the lack of entanglements and favorable interactions with the polymeric matrix. In contrast, polymeric dispersing agents can have favorable interactions and entanglements with the polymeric matrix, but the loading levels of these materials is often extremely high and is further exacerbated by the high surface area of nanoparticle systems. The weight percentage of the dispersing agent then becomes significant and leads to decreased performance.

A significant opportunity therefore exists to develop a general approach to the design of dispersing agents which combine the specificity and high binding strength of small molecules with the favorable interactions of polymeric dispersants. To address these issues, new dispersing agents were designed based on macromolecular architectures which optimally present, both surface active groups for attaching to the surface of the nanoparticle, and matrix interacting groups which promote dispersion in the polymeric matrix. Hybrid dendritic linear block copolymers satisfy these criteria with the dendritic unit being used as the 'head' group to interact with the nanoparticle surface while the linear block is able to entangle and interact with the polymeric matrix. While dendritic macromolecules have found extensive use as stabilizing agents for nanoparticle formation, all of these studies have utilized the dendrimer as a nanoreactor for localized growth of the nanoparticles within the dendritic framework. No studies have been reported describing the use of hybrid dendritic linear block copolymers to stabilize the surface of nanoparticles even though the surface activity of these systems is well noted. In particular, the numerous reactive groups at the chain ends of the dendrimer have been shown to lead to an optimal conformation for interacting with surfaces. The absence of chain folding and chain dynamics when compared to functionalized linear chains is also expected to lead to a much stronger interaction with, and greater coverage of the nanoparticle at significantly lower loading of the block copolymer. Previously, Frechet has shown that poly(ethylene glycol) based hybrid structures can cover the surface of cellulose fibers at very low concentrations due to a combination of self-assembly and physisorption.

SUMMARY OF THE INVENTION

The present invention provides a dendritic macroinitiator composition, capable of being used for the production of hybrid dendritic-linear copolymers, comprising a compound of the general formula, Fx-[G-n]-I, where F is the chain end functional group of the dendrimer, x is the number of chain end functional groups, G is the dendrimer, n is the generation number of the dendrimer, and I is the initiating group.

The invention also provides for a process for producing dendritic macroinitiators comprising performing esterification of an acetonide protected dendrimer of the formula Fx-[G-n]-Y, where F is the chain end functional group of the dendrimer, x is the number of chain end functional groups, G is the dendrimer, n is the generation number of the dendrimer, and Y is the reactive group to which the initiating group is attached; and coupling of the anion of the dithiobenzoic acid.

In a more particular embodiment, the above process further comprises a series of deprotection and coupling reactions to divergently grow dendritic units of said macroinitiators.

In another embodiment, a composition of hybrid dendritic-linear copolymers is provided comprising a compound of the general formula, Fx-[G-n]-Pz, where F is the chain end functional group of the dendrimer, x is the number of chain end functional groups, G is the dendrimer, n is the generation number of the dendrimer, P is the repeat unit of the linear polymer, and z is the number of repeat units of the linear polymer.

In yet another embodiment, a process for producing hybrid dendritic-linear copolymers is provided using living free radical polymerization comprising performing polymerization of a vinyl monomer with a dendritic macroinitiator comprising the formula of Fx-[G-n]-I, where F is the chain end functional group of the dendrimer, x is the number of chain end functional groups, G is the dendrimer, n is the generation number of the dendrimer, and I is the initiating group for living free radical polymerization.

In a more particular embodiment, the above mentioned process of producing hybrid dendritic-linear copolymers is provided further comprising adding a polymerization initiator.

In yet another embodiment of the invention, the above mentioned process of producing hybrid dendritic-linear copolymers is provided further comprising deprotection and functionalization reactions. In a more particular embodiment, the functionalization reactions are either a) reactions with succinic anhydride to yield carboxylic hybrid dendritic-linear copolymers; b) esterification of the hydroxyl chain ends using anhydride chemistry to produce disulphide terminated hybrid dendritic-linear copolymers; c) reactions with 5-(dioctylphosphoryl)pentanoic anhydride to produce phosphine oxide terminated hybrid dendritic-linear copolymers; or d) Click reactions to produce phosphonic acid terminated hybrid dendritic-linear copolymers.

In another embodiment, polymer products produced from the above functionalization reactions are provided.

In yet another embodiment, a method of using hybrid dendritic-linear copolymers to disperse nanoparticles in matrix materials is provided comprising having a solution of nanoparticles; adding a solution of a hybrid dendritic-linear copolymer; and mixing with a solution of a polymer.

BRIEF DESCRIPTION OF THE DRAWINGS

For a more complete understanding of the present invention, reference is now made to the following descriptions taken in conjunction with the accompanying figures, in which.

DETAILED DESCRIPTION OF THE INVENTION

Modular dendritic-linear hybrid copolymers are provided that are highly efficient dispersive agents for nanoparticles in matrices. These hybrid copolymers have dendritic chain end groups, as well as the repeat units of the linear polymer chain, that can be easily varied.

Figure 1:
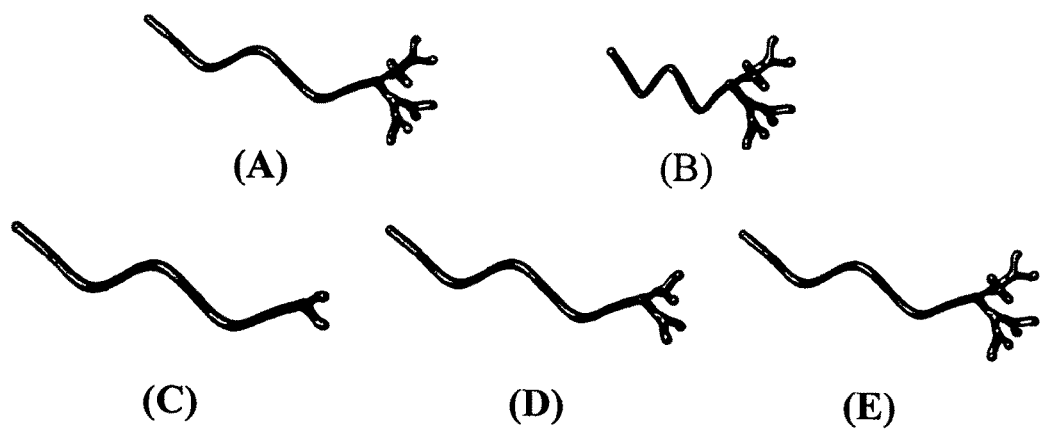
FIG. 1 shows a graphical representation of modular changes in the structure of hybrid dendritic-linear diblock copolymers through varying the nature of the end groups (A), length of linear block (B) or via the changing the generation number of the dendritic block, [G-1] (C), [G-2] (D) and [G-3] (E).

The modular nature of these dendritic-linear hybrid copolymers (herein also referred as dendrimers), which allows the nature and length of the linear polymer and/or functional groups at the chain end of the dendrimers be simply changed, permits the tailoring of strategies to essentially any nanoparticulate and matrix. FIG. 1 shows Graphical representation of modular changes that can be made in the structure of dendritic-linear hybrid copolymers through varying the nature of the end groups (A), length of linear block (B) or via the changing the generation number of the dendritic block, [G-1] (C), [G-2] (D) and [G-3] (E).

The linear blocks (B) can be copolymers such as, but not limited to, vinyl polymers derived from styrenic, acrylates, methacrylates, acrylonitrile and the like, ring opening polymers derived from lactones, epoxides, norbornenes and the like.

Preferred copolymers are random copolymers based on styrene, butyl acrylate, methyl methacrylate, acrylonitrile, butadiene and isoprene.

Examples of dendritic chain end/functional groups within these hybrid copolymers are, but not limited to carboxylic acids, phosphonic acids, sulphonic acids, alcohols, phenols, amines, thiols, sulphides, amides, and pyridines.

The provided modular library of hybrid dendritic-linear copolymers can be prepared by RAFT polymerization starting from monodisperse dendritic macroinitiators. Herein, the term "dendritic macroinitiators" will be used to refer to the RAFT agent at the focal point and the dendrimer to which it is attached.

These dendritic macroinitiators can comprise a compound of the general formula, Fx-[G-n]-I, where F is the chain end functional group of the dendrimer, x is the number of chain end functional groups, G is the dendrimer, n is the generation number of the dendrimer, and I is the initiating group. For the chain end groups—x is 2 to 128, more preferably 2 to 16; n (generation number) is 1 to 7 more preferably 1 to 4; and z—(number of repeat units) is 2 to 10000, more preferably 2 to 100.

By accurately controlling the molecular weight of the linear block, generation number of the dendrimer and the nature of the dendritic chains ends the performance of these hybrid block copolymers as dispersing agents for a range of nanoparticles was optimized. For titanium dioxide nanoparticles, optimum dispersion in linear poly(methyl methacrylate) was achieved with a second generation dendrimer containing 4 carboxylic acid end groups with the quality of dispersion being better than commercial dispersing agents for TiO$_2$. The well-defined number and optimal presentation of the dendritic chain end groups also allowed novel hybrid dendritic-linear dispersing agents to be prepared for the dispersing of Au and CdSe nanoparticles based on disulphide and phosphine oxide end groups.

Figure 2:
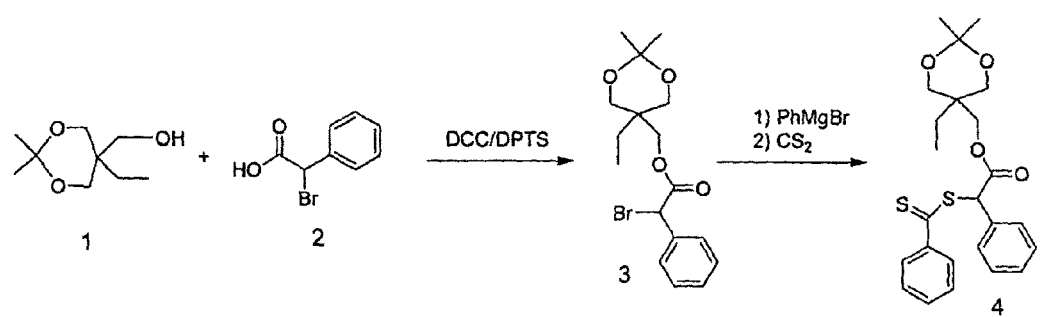
FIG. 2 shows a scheme for the synthesis of $1^{st}$ generation RAFT agent for the growth of dendritic macroinitiators.

In designing hybrid dendritic-linear block copolymers, dendrimers based on 2,2-bis(methylol)propionic acid (bis-MPA) were chosen due to their commercial availability and widespread use, while the linear chain was based on vinyl polymers prepared by reversible addition fragmentation chain transfer polymerization (RAFT). The synthesis of the dendritic RAFT agent starts with N,N'-dicyclohexylcarbodiimide (DCC) mediated esterification of the acetonide protected trimethylol propane, 1, and α-bromophenylacetic acid, 2. Coupling of 3 with the anion of dithiobenzoic acid, which is prepared from the reaction of phenylmagnesium bromide with carbon disulfide, then gives the desired dithioester, 4, in an overall yield of greater than 90% (See FIG. 2).

Figure 3:
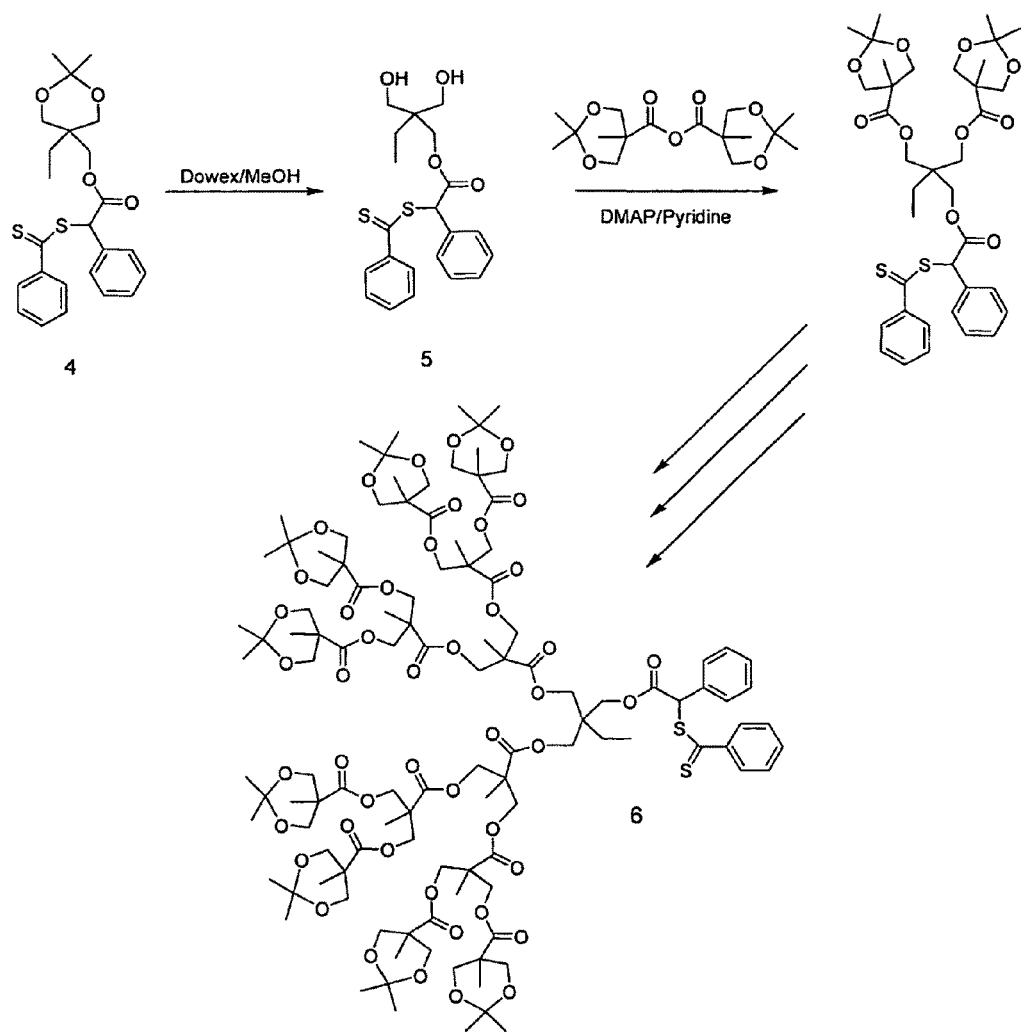
FIG. 3 shows a scheme for the synthesis of dendritic macroinitiators with a single dithioester RAFT initiator at the focal point.

The stability of the dithioester RAFT agent to functional group manipulation was then demonstrated by divergently growing dendritic units from 4 via a traditional series of deprotection and coupling reactions (See FIG. 3). The deprotection reactions were performed utilizing acidic Dowex resins in methanol and the addition reactions accomplished by esterification of the hydroxyl chain ends with the anhydride of the acetonide protected bis-MPA. Both steps proceed readily with purified yields of over 90% for 10-20 gram batches which allowed dendrons of the first, 5, to the fourth generation, 6, to be prepared with a single dithioester RAFT agent at the focal point.

Figure 4:
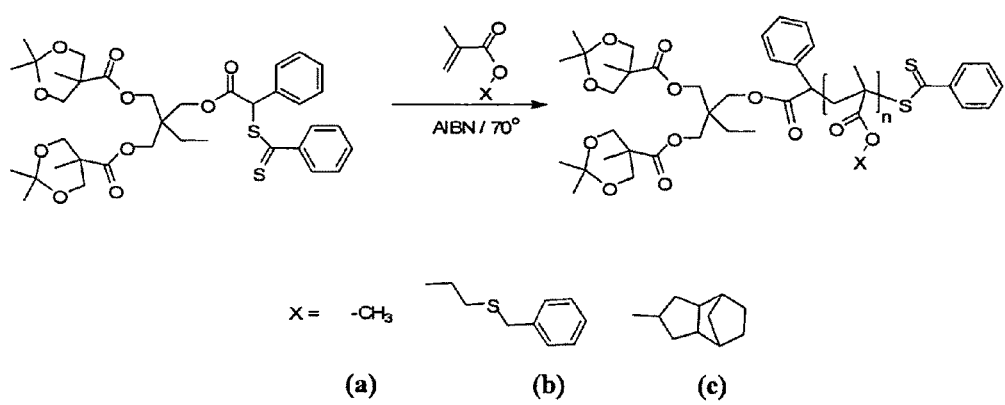
FIG. 4 shows a scheme for RAFT polymerization of methacrylate monomers with a second generation dendritic macroinitiator, 7.
Figure 5:
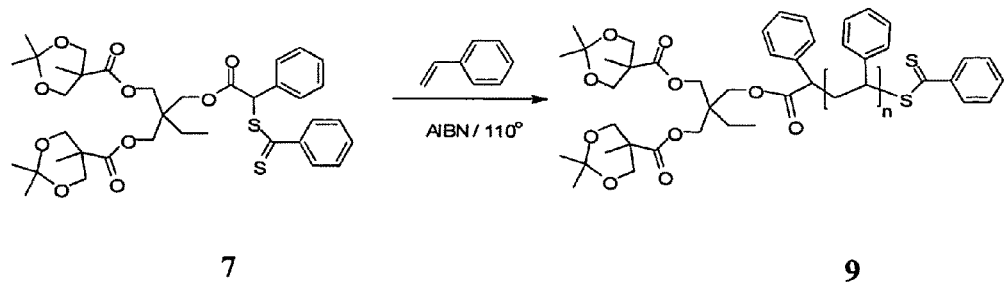
FIG. 5 shows a scheme for RAFT polymerization of styrene with a second generation dendritic macroinitiator, 7.
Figure 6:
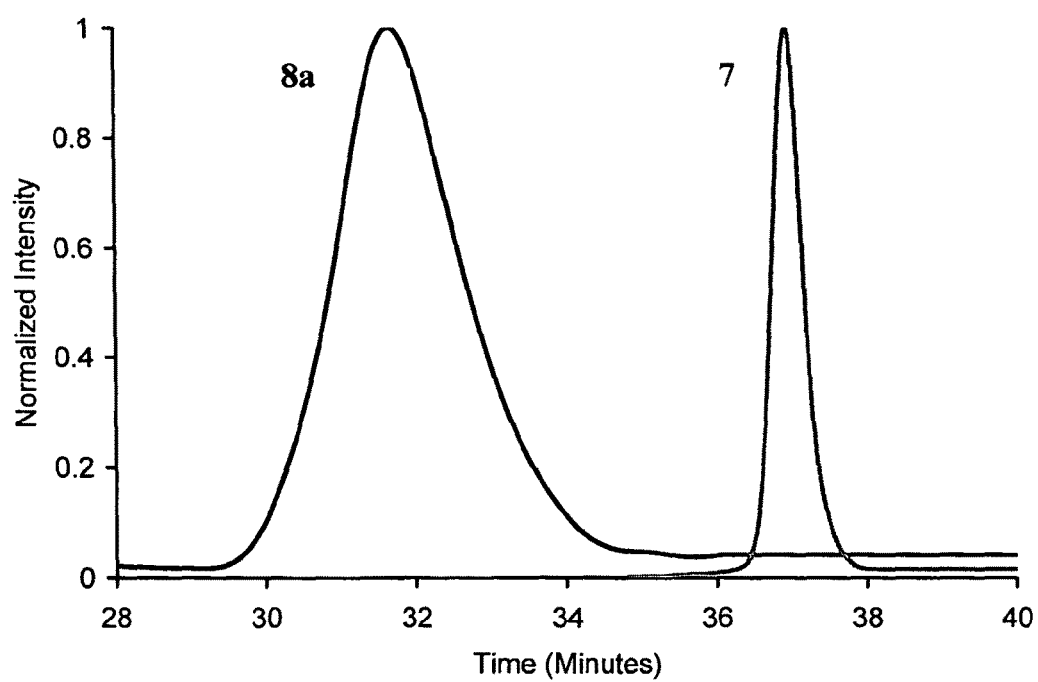
FIG. 6 shows a size exclusion chromatographs for the hybrid dendritic-linear block copolymer, 8a ($M_n$=6200, PDI=1.19) obtained from the RAFT polymerization of methyl methacrylate with the second generation dendrimer, 7.

In the next step, polymers are grown from the single dithioester RAFT group at the focal point of the dendrimer by RAFT polymerization. Due to the presence of both a phenyl substituent and ester group attached to the α-carbon of the dithioester, these dendritic macroinitiators can be used for polymerization of a variety of monomers including methacrylates with AIBN as the initiator at 70° C. in the bulk (See FIG. 4) or styrene at 110° C. in the bulk (See FIG. 5). In each case the efficiency of polymerization from the RAFT macroinitiator was found to be 75-95% depending on the generation number and the actual percentage could be uniquely identified and quantified due to the narrow GPC peak for the starting RAFT macroinitiator. The high solubility of the dendritic RAFT macroinitiator was also beneficial during purification as it allowed the block copolymer to be purified by simple precipitation and/or column chromatography and the lack of residual macroinitiator confirmed by GPC (FIG. 6). Significantly, in all cases the polymerizations occurred under controlled conditions and allows for the degree of polymerization of the linear block to be accurately controlled. This affords a range of hybrid dendritic-linear block copolymers in which the length of the linear chain and the generation number of the dendritic block could be accurately controlled (see Table 1, below), where MMA is methyl methacrylate, and Bz-TEMA is benzyl thioethyl methacrylate.

TABLE 1

| Generation Number | Monomer | Reaction Time (hrs) | Conversion | Mn | PDI |
|---|---|---|---|---|---|
| 1 | MMA | 5:30 | 75 | 25400 | .13 |
| 2 | MMA | 4:30 | 67 | 27700 | .13 |
| 3 | MMA | 5:10 | 84 | 27300 | .15 |
| 4 | MMA | 4:00 | 65 | 24600 | .13 |
| 1 | MMA | 2:55 | 53 | 5010 | .21 |
| 2 | MMA | 1:40 | 65 | 5190 | .24 |
| 3 | MMA | 1:25 | 84 | 5880 | .23 |
| 1 | Bz-TEMA | 0:50 | 87 | 14100 | .1 |
| 2 | Bz-TEMA | 1:10 | 86 | 14400 | .12 |
| 3 | Bz-TEMA | 1:40 | 81 | 16000 | .12 |
| 2 | Bz-TEMA | 1:00 | 84 | 26200 | .29 |
| 2 | Styrene | 28:00 | 72 | 7300 | .05 |
| 2 | Styrene | 28:00 | 74 | 39200 | .14 |

Hybrid dendritic-linear copolymers made from such polymerization reactions comprise of the general formula, Fx-[G-n]-Pz, where F is the chain end functional group of the dendrimer, x is the number of chain end functional groups, G is the dendrimer, n is the generation number of the dendrimer, P is the repeat unit of the linear polymer, and z is the number of repeat units of the linear polymer.

The modular nature of this synthetic approach is further increased by manipulation of the chain end groups. To this end, the acetonide protected end-groups of the starting hybrid dendritic-linear systems, 8a, were quantitatively removed with acidic Dowex resin to give hydroxyl-functional dispersing agents, 9a. The hydroxyl groups could then further be reacted with succinic anhydride to yield carboxylic functional dispersing agents, 10a (See FIG. 7).

Figure 8:
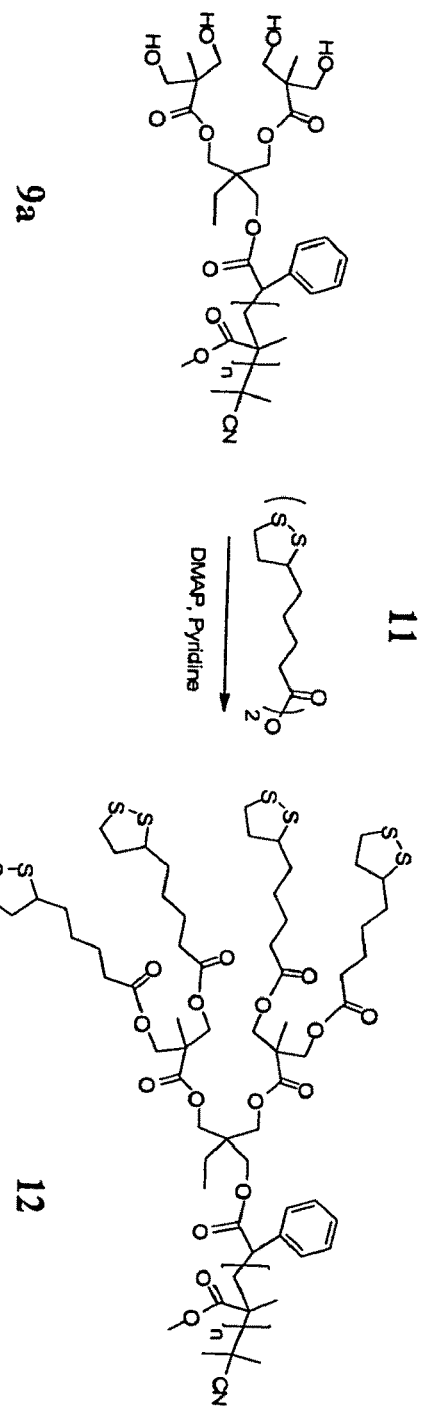
FIG. 8 shows a scheme for the synthesis of disulphide terminated hybrid block copolymers, 12, for dispersion of Au nanoparticles.

To broaden the range of nanoparticles that could be dispersed using this modular system, modification of the dendritic chain end can be easily accomplished by esterification of the hydroxyl chain ends using anhydride chemistry. In order to demonstrate this critical feature, Au and CdSe nanoparticles were chosen as test vehicles due to their specific surface chemistry. For Au nanoparticles, a dispersing agent with thioctic ester chain ends was prepared by reacting the hydroxyl chain ends of 9 with the anhydride derived from (±)-thioctic acid, 11, to give the tetra(disulphide) derivative, 12 (See FIG. 8).

Figure 9:
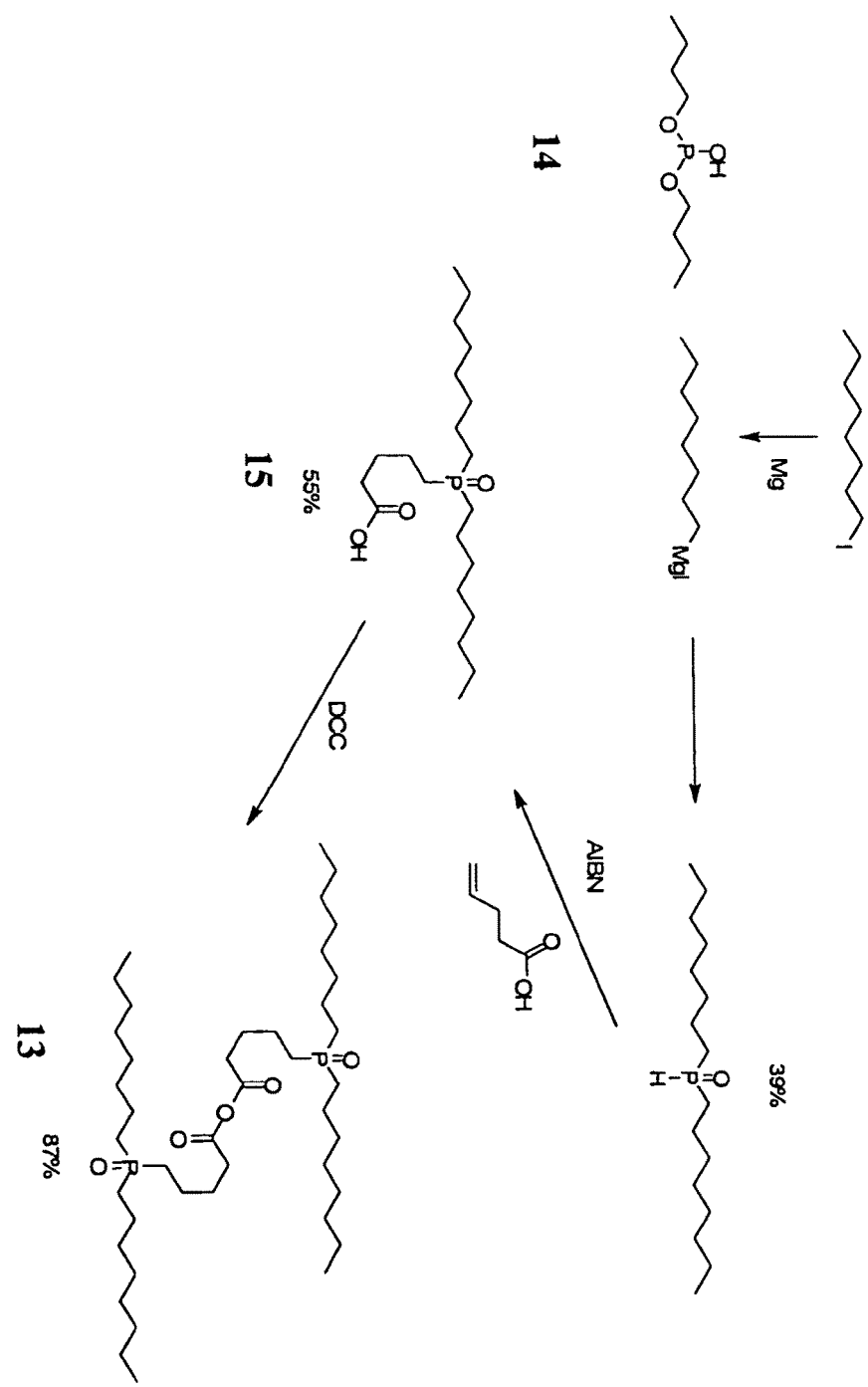
FIG. 9 shows as scheme for the synthesis of 5-(dioctylphosphoryl)pentanoic anhydride, 13.
Figure 10:
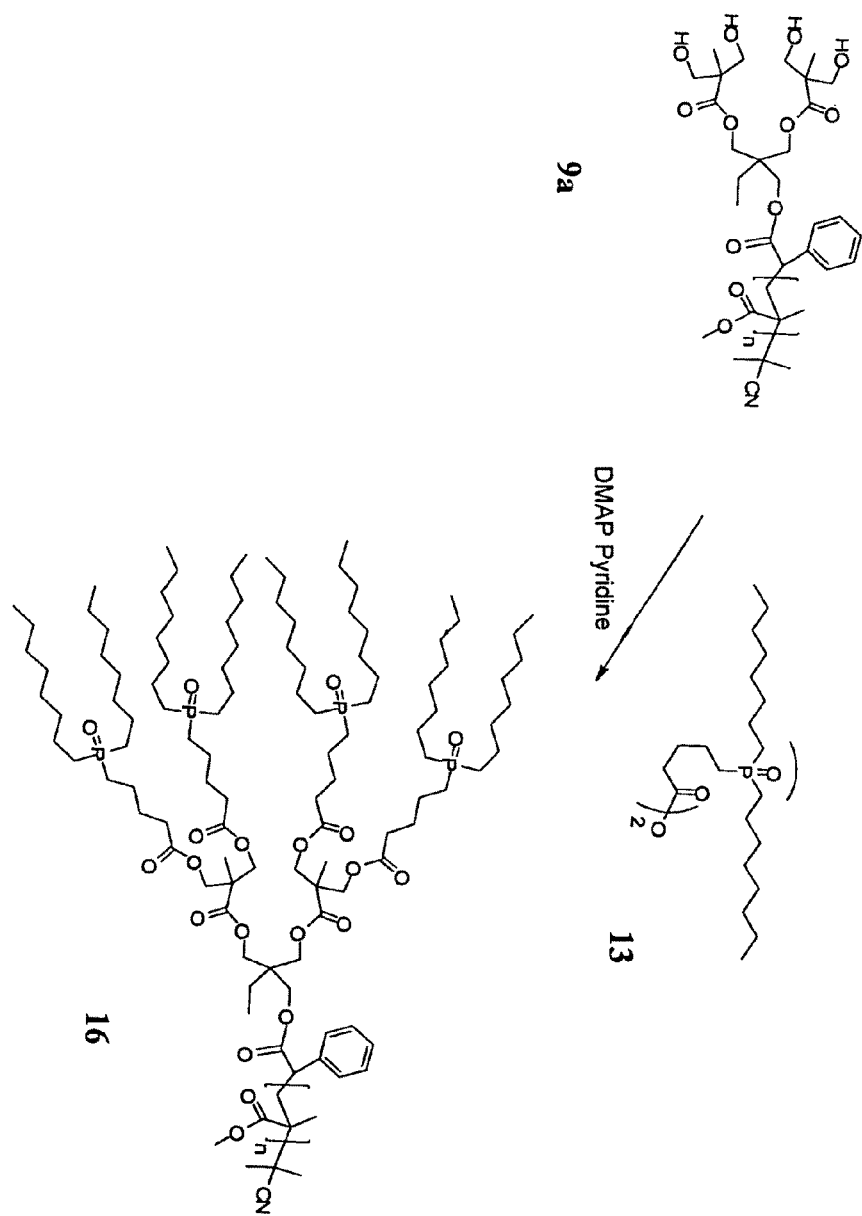
FIG. 10 shows a scheme for the synthesis of tetrafunctional phosphine oxide PMMA derivative, 16.

In a similar vein, hybrid dispersing agents were designed for CdSe nanoparticles and in this case, phosphine oxide chain ends were required for interaction with the surface of the CdSe. Using an anhydride functionalization approach requires 5-(dioctylphosphoryl)pentanoic anhydride, 13, which was synthesized by initial alkylation of di-n-butyl phosphate, 14, with octylmagnesium iodide followed by reaction with 4-pentenoic acid using AIBN to give 5-(dioctylphosphoryl)pentanoic acid, 15, which was converted into the desired anhydride, 13, using DCC (See FIG. 9). The anhydride was then used to functionalize the chain ends of 9a to give the phosphine oxide functionalized dendritic-linear copolymer, 16 (See FIG. 10).

Figure 11:
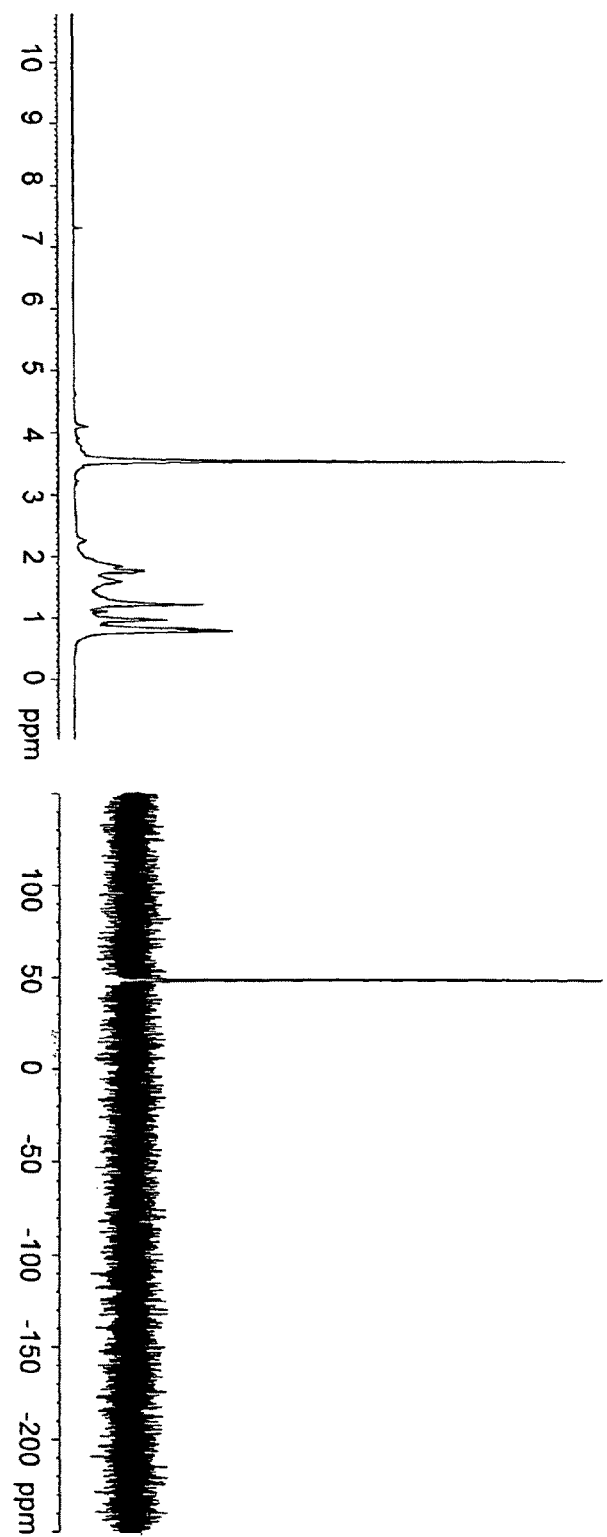
FIG. 11 shows a $^1$H (left) and $^{31}$P (right) NMR spectra of (phosphine oxide)$_4$-[G-2]-PMMA, 16.

In all the above examples the hybrid dendritic-linear block copolymers were fully characterized by NMR and MALDI spectroscopy coupled with GPC. The well-defined structure of these derivatives allows accurate identification and quantification of the number and nature of the chain ends groups which was in full agreement with the synthetic strategy. For example, FIG. 11 shows the $^1$H and $^{31}$P NMR data for the phosphine oxide functionalized dispersing agent ((Phosphine oxide)$_4$-[G-2]-PMMA, 16) and an unique resonance for the methylene group alpha to the carbonyl is observed at 2.25 ppm the $^1$H NMR while a single resonance is observed in the $^{31}$P NMR spectrum corresponding with phosphine oxide groups.

Figure 12:
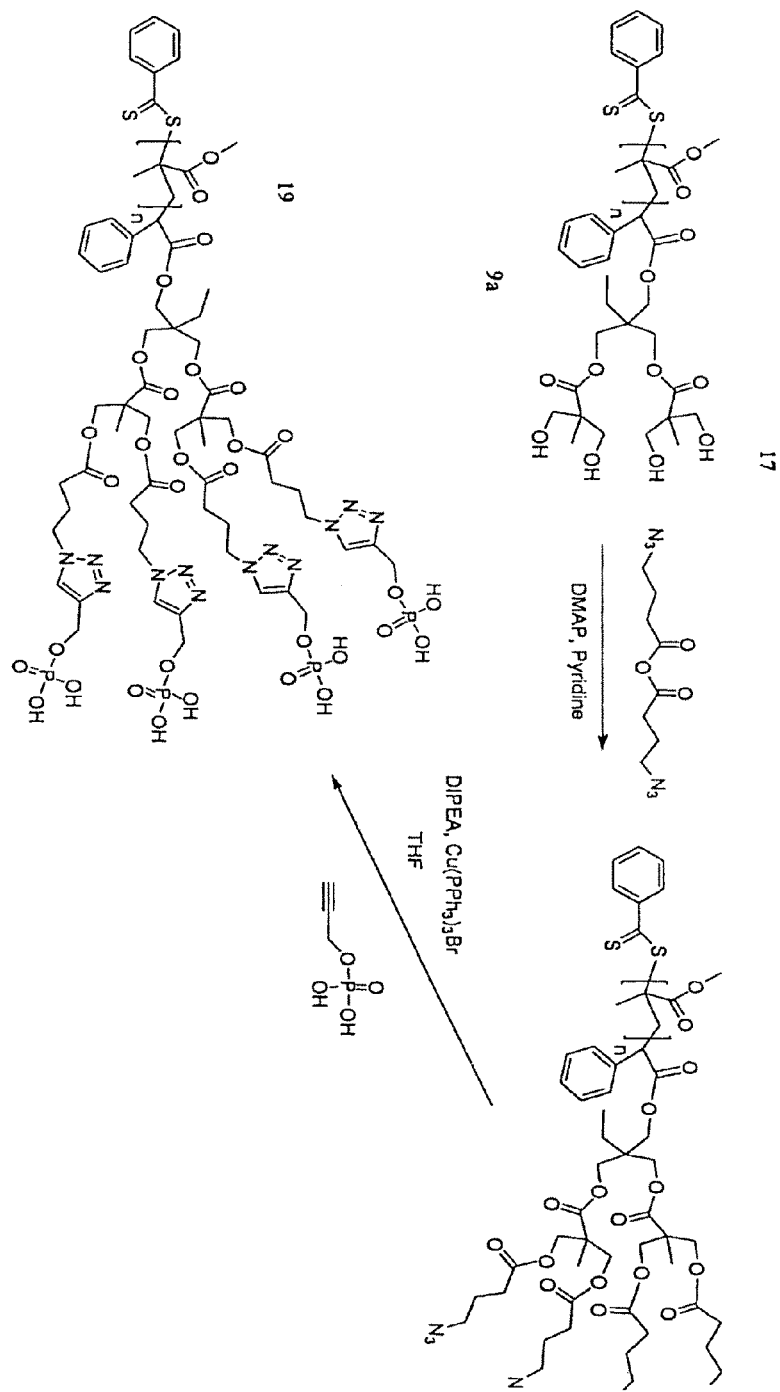
FIG. 12 shows a scheme for the orthogonal synthesis of phosphonic acid functionalized dendritic dispersant, 19.

A critical feature of the chain end modification chemistry and modularity of this approach is to ensure that all the end groups of the dendritic dispersing agent are functionalized with high efficiency and few, if any, side reactions. While esterification using anhydride chemistry was shown above to lead to high levels of functionalization, the synthesis of phosphonic acid end groups which are highly desirable for a variety of nanoparticle surfaces could not be accomplished using this strategy. In order to further expand the array of possible chain end, an orthogonal approach was developed based on the copper (I) catalyzed 1,3-dipolar cycloaddition between azides and terminal acetylenes (Click reaction) which is more tolerant of reactive functional groups. To illustrate the versatility of this approach, the introduction of phosphonic acid end groups via Click chemistry was investigated by first introducing an azide end-group through esterification of the hydroxyl chain ends with the anhydride derived from 4-azidobutanoic acid, 17. The corresponding acetylene derivative was then prepared by reaction of propargyl alcohol with phosphorous acid and iodide in triethylamine which could then be coupled with the azido-terminated derivative, 18, to give directly the desired phosphonic acid functionalized hybrid dendritic-linear diblock copolymers, 19 (See FIG. 12).

Figure 13:
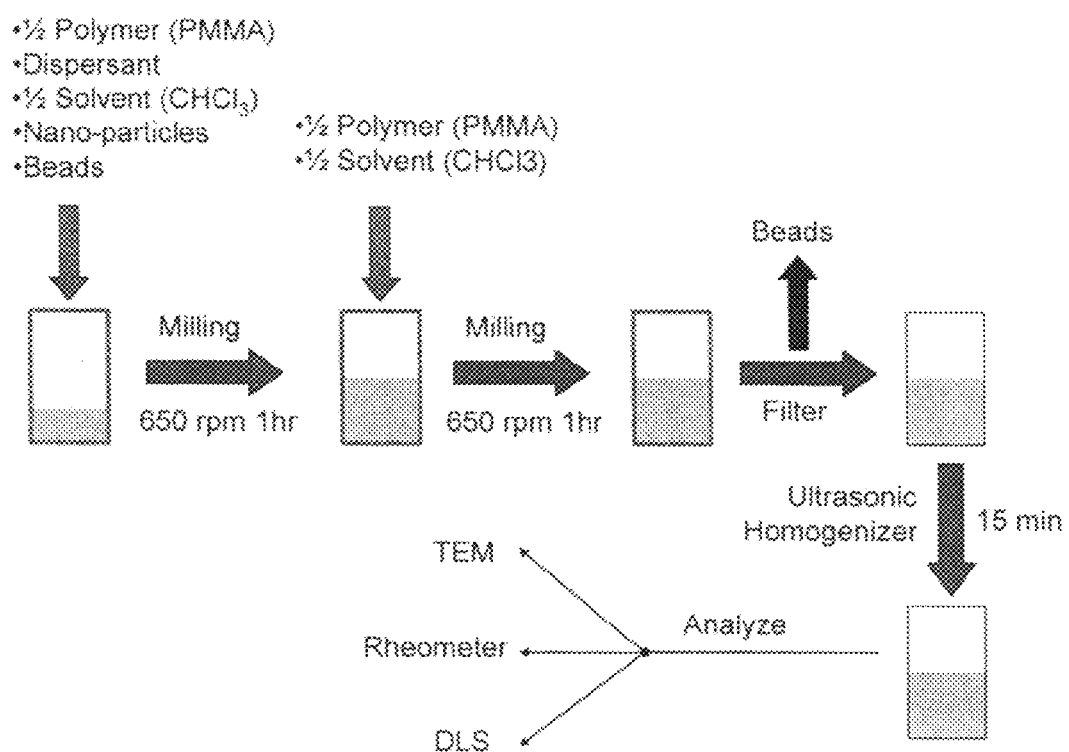
FIG. 13 shows a procedure for milling experiments.

Dispersion Studies. The synthesis of a library of hybrid dendritic-linear dispersing agents with accurate control over a range of structural features then allowed the dispersion activities of these novel systems to be studied in detail. As an initial test platform, the dispersion of $TiO_2$ nanoparticles in a high molecular weight poly(methyl methacrylate) matrix was examined in detail. For all the dispersing experiments, a planetary ball mill and Zirconia milling jars with 3 mm zirconia grinding balls were used and initially 50 wt % of the polymer and the dispersing agent is added to the milling jar followed by 50 wt % of the solvent, the $TiO_2$ nanoparticles, and the milling beads. This mixture is then milled for one hour at 650 rpm, the remaining polymer and solvent added, and milling continued for one hour at 650 rpm. (See FIG. 13)

The dispersing experiments were carried out in chloroform (20 wt % solids) with commercially available $TiO_2$ nanoparticles with (TTO-51(A)) and without (TTO-51N) alumina coating in a matrix of PMMA (150,000 Da). The nanoparticle dispersions were analyzed with dynamic light scattering (DLS), transmission electron microscopy (TEM) and rheometrical studies. For evaluation purposes, the performance of the hybrid dendritic-linear dispersing agents were compared with the commercially available Disperbyk-111, Disperbyk-170, Disperbyk-180 agents that have found wide use for the dispersing of inorganic nanoparticles such as $TiO_2$.

Figure 14:
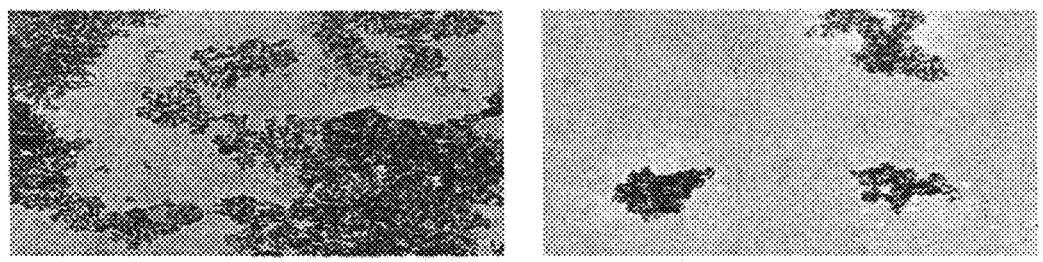
FIG. 14 shows a TEM image of TiO$_2$ nanoparticles with poly(methyl methacrylate) in the absence of any dispersing agents.
Figure 15:
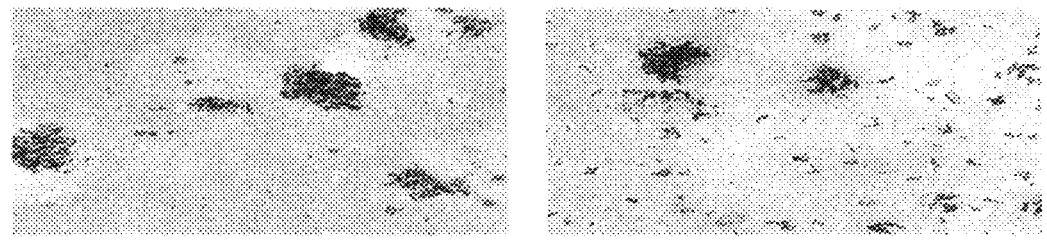
FIG. 15 shows a TEM image of TiO$_2$ nanoparticles with poly(methyl methacrylate) in the presence of commercial dispersing agents (Disperbyk-170 (left) and Disperbyk-180 (right).).
Figure 16:
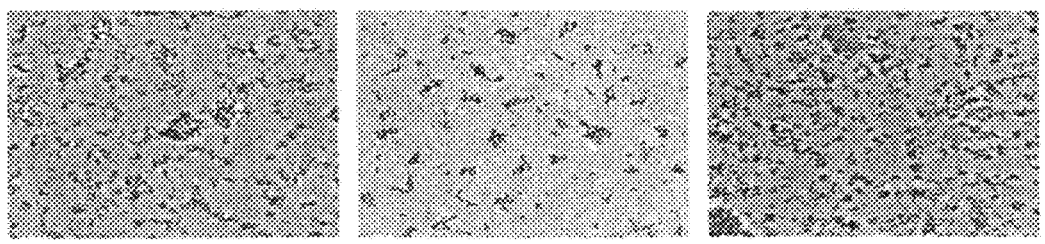
FIG. 16 Shows TEM images of TiO$_2$ nanoparticles with poly(methyl methacrylate) in the presence of different concentrations of commercial dispersing agent, Disperbyk-111 (10% (left), 5% (middle), and 2.5% (right)).

Initial TEM studies showed that in the absence of any dispersing agents, both types of $TiO_2$ nanoparticles led to only large clusters of nanoparticles being observed which is expected due to the large surface area of the nanoparticles and poor compatibility with poly(methyl methacrylate) (See FIG. 14). Similar results were observed for two of the commercial dispersing agents (Disperbyk-170 and Disperbyk-180, See FIG. 15) while the Disperbyk-111 showed better results with high quality dispersions being observed for a variety of different concentrations (See FIG. 16)

Figure 17:
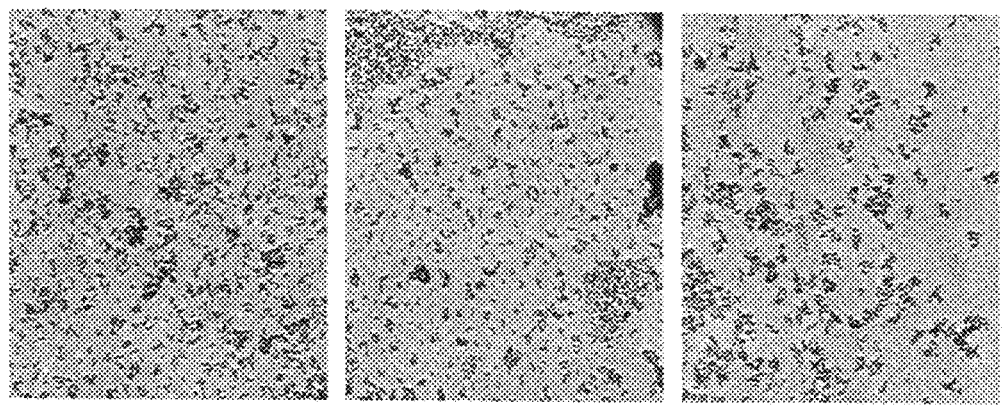
FIG. 17 shows TEM images of different generations of carboxylic functional dispersing agents with unmodified (TTO-51N) nano-particles (HOOC)$_2$-G1-PMMA (left), (HOOC)$_4$-G2-PMMA (middle), (HOOC)$_8$-G3-PMMA (right).
Figure 18:
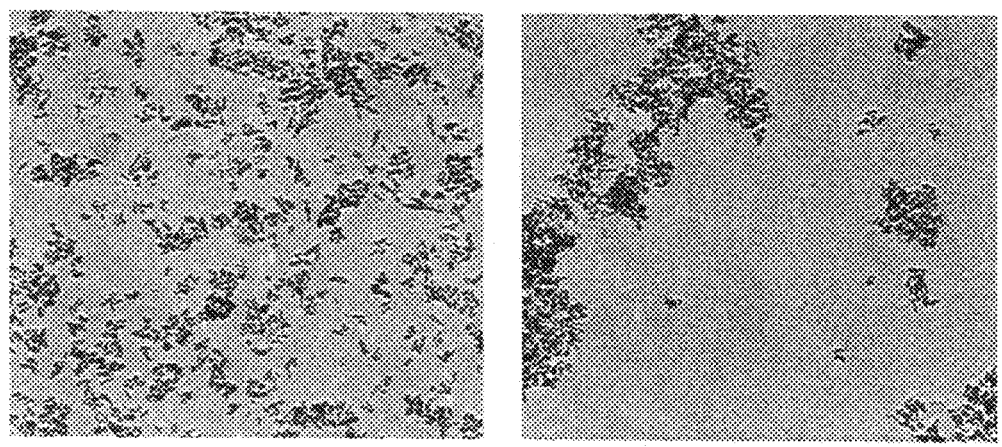
FIG. 18 shows TEM images of different generations of phosphoric acid functional dispersing agents. (H$_2$PO$_4$)$_4$-G2-PMMA (left) and (H$_2$PO$_4$)$_8$-G3-PMMA (right).
Figure 19:
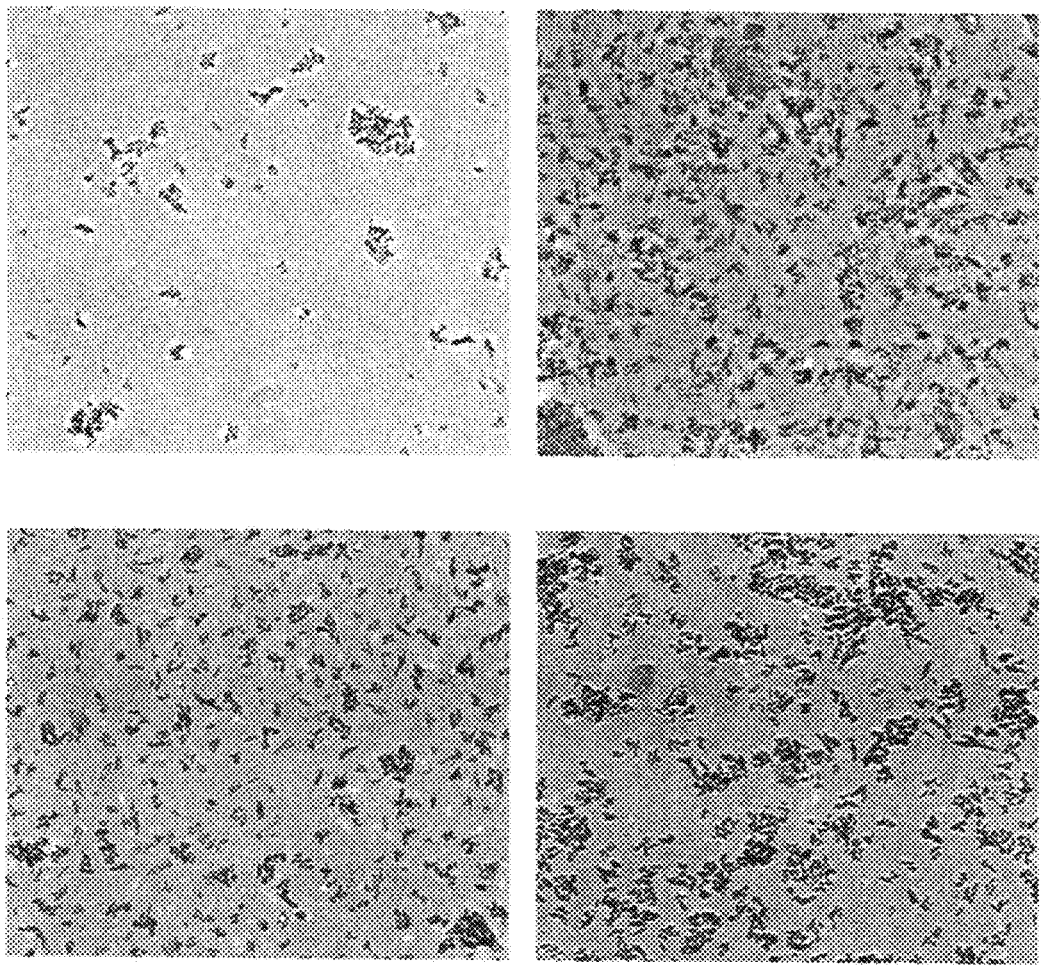
FIG. 19 shows TEM images of different dispersions with agents. (HO)$_4$-G2-PMMA (top left), Disperbyk-111 (top right), (HOOC)$_4$-G2-PMMA (lower left), and (H$_2$PO$_4$)$_4$-G2-PMMA (lower right).

For the hydroxyl, carboxy and phosphonic acid terminated hybrid dendritic-linear dispersing agents, generations 1-3, with a uniform PMMA block of DP=50, were initially examined and compared within the same series to determine the optimal generation number for the dendritic head group. For each series the level of dispersion increased on going from generation 1 to generation 2 and then decreased on going to generation 3 and can be visually seen in FIG. 17. This optimum size for the dendritic head group of generation 2 is similar to the pioneering studies from Fréchet on the adsorption of dendritic-linear copolymers to the surface of PET and cellulose. Comparison between the different series showed a significant influence due to the nature of the end group, the hydroxyl terminated derivatives showed only marginal dispersing activity with the majority of nanoparticles being present at aggregates. Similarly the phosphonic acid terminated hybrid structures gave improved performance but a mixture of aggragates and individual nanoparticles could still be observed (FIG. 18). Only for the dendritic-linear block copolymers with carboxy chain ends is excellent dispersion observed with individual nanoparticles and small aggregates predominating. Of particular note is the comparison with the best performing commercial dispersing agent, Disperbyk-111, which under the same dispersing condition showed quantitatively poorer performance when compared to 10a (See FIG. 19).

Figure 20:
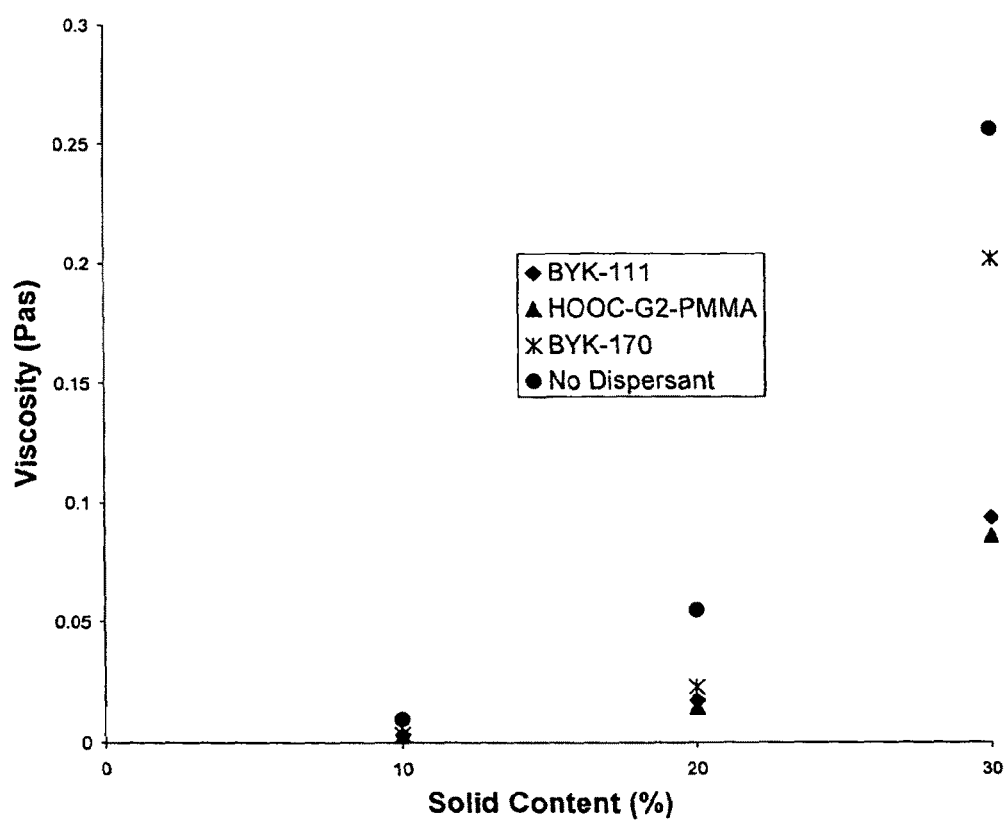
FIG. 20 shows a histogram of viscosity vs. concentration of solids for the different dispersing agents.

A further gauge of the qualitative performance of the hybrid dendritic-linear dispersants was obtained from a systematic study of the viscosity vs. concentration of solids (10-30% of solids in $CHCl_3$) for the different dispersing agents. As can be seen in FIG. 20, the viscosity of nanoparticle suspensions was reduced marginally by the use of the commercial dispersing agent, BYK-170. In contrast both the BYK-111 and the hybrid structure based on a linear PMMA chain and a second generation dendrimer with carboxylic acid end group gave significantly lower viscosities which again demonstrates good dispersion and the lack of large nanoparticle aggregates.

To obtain quantitative data for the performance of the hybrid dendritic-linear macromolecules as dispersing agents, dynamic light scattering (DLS) was used as a complement to the TEM measurements. The samples were therefore diluted to 0.5% of the original concentration for the DLS measurements and the intensity correlation functions collected at 5 different angles (30, 60, 90, 110, and 130 degrees). A sum of two exponentials was then fitted to the intensity correlation function and the decay rates were obtained from the fit.

Figure 21:
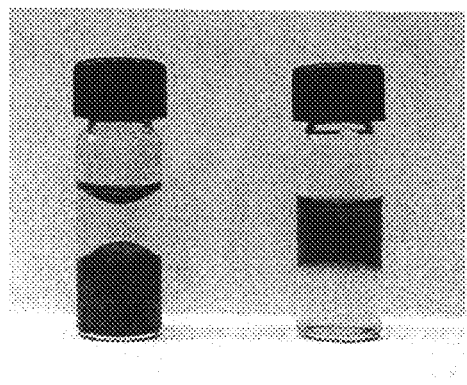
FIG. 21 shows a photographic image of citrate stabilized gold particles in chloroform water mixtures with the dispersing agent (thioctic)$_4$-G2-PMMA (left) and without dispersing agent (right).

Dispersion studies for gold nanoparticles. In order to assess the applicability of hybrid dendritic-linear dispersants to gold nanoparticles, citrate-stabilized gold particles of average diameter 12 nm were prepared in aqueous solution using the method of Turkevich et al. A solution of the thioctic acid-functionalized hybrid dendritic-linear dispersant in tetrahydrofuran (7 mg dispersant in 2.5 mL of tetrahydrofuran) was added to a small sample of gold particles (1 mg gold in 5.5 g water) in a glass vial, with thorough mixing to ensure that the dispersant attached to all gold particles, displacing the surface citrate groups. 2 mL of chloroform were added and the two-phase system mixed to allow the polymer-stabilized gold nanoparticles to undergo phase-transfer into the chloroform layer (FIG. 21) following the method of Schiller et al.

The gold nanoparticles were concentrated by centrifugation at 15,000 rpm for 20 minutes, and the supernatant liquid (containing excess dispersant) removed. Residual chloroform was removed from the gold particles under reduced pressure. Finally, the gold nanoparticles were redispersed in 1 mL of benzene, together with 10 mg of the same high molecular weight poly(methyl methacrylate) used in the dispersion studies already described.

Figure 22:
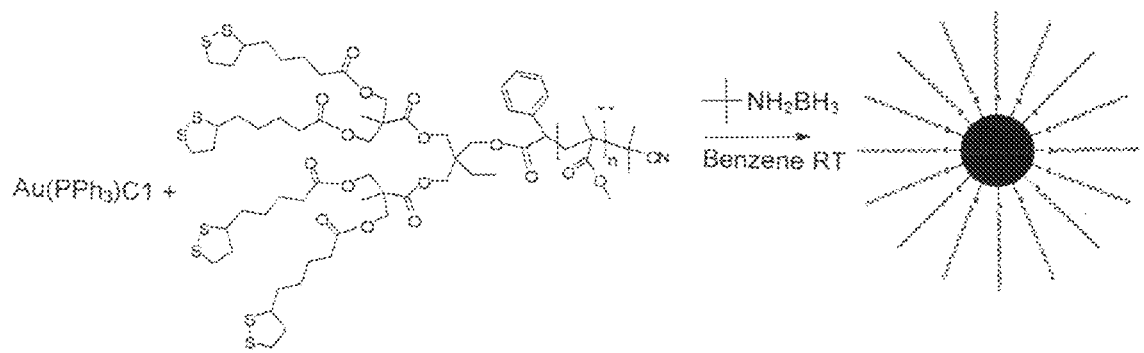
FIG. 22 shows a schematic for the synthesis of dispersing agent capped gold nanoparticles.

Synthesis of polymer-stabilized gold nanoparticles. To further test the effectiveness of the thioctic-acid functionalized hybrid dendritic-linear dispersant, this material was employed as a stabilizing agent in the synthesis of hydrophobic gold nanoparticles. The synthetic approach used here (FIG. 22) was that of Zheng et al., which has been shown to yield monodisperse gold nanoparticles at low temperatures in a variety of organic solvents. In the present study the thioctic acid-functionalized dispersant replaces the small-molecule surface stabilizing group (e.g. alkanethiol) typically employed in the particle synthesis. Gold precursor (AuPPh$_3$Cl, 10 mg) and the thioctic acid-functionalized dispersant (50 mg) were dissolved in benzene (2 mL). The reducing agent, tert-butylamine-borane (18 mg), was dissolved separately in benzene (2 mL) and then added to the gold solution, and the mixture stirred at room temperature for 16 hours, over which time the solution developed a dark purple colour. The gold particles were purified by precipitation with methanol and were readily redispersed in benzene. Analysis by TEM revealed gold nanoparticles with sizes in the range of 3-7 nm.

Figure 23:
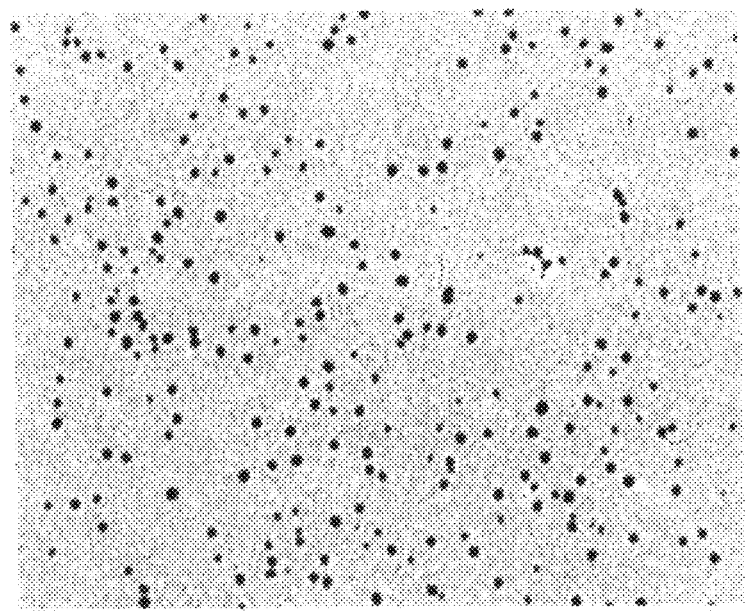
FIG. 23 shows a TEM of gold nanoparticles dispersed in PMMA.

The gold particles was dispersed in a matrix of PMMA (10 wt % of gold) by adding PMMA to the benzene solution of gold nanoparticles. The solution was dropcasted on a TEM grid and the TEM shows that the gold nanoparticles are well dispersed in the PMMA matrix (FIG. 23).

CONCLUSIONS

The ability to accurately control molecular architecture has been used to prepare a library of hybrid dendritic-linear block copolymers based on a novel synthetic strategy using dendritic RAFT macroinitiators. This allows the degree of polymerization of the linear block, as well as the generation number of the dendrimer, to be controlled. This strategy coupled with the use of facile chain end modification chemistry permitted these novel dispersing agents to be tuned for a variety of inorganic nanoparticles such as TiO$_2$, Au and CdSe. For TiO$_2$, the optimal structure proved to be a second generation dendritic head group with carboxylic acid chain ends and dispersing agents based on these hybrid structures proved to be superior dispersing agents when compared to commercially available materials. Similar results were found for hybrid dendritic-linear dispersing agents containing disulphide (for Au) and phosphine oxide (for CdSe) chain ends and in each case uniform dispersion of discrete nanoparticles was observed in both solution as well as polymer matrixes. These results demonstrate the power of well-defined macromolecular architectures to control interfacial interactions which are critical in the application of nanoparticles.

EXPERIMENTAL

Figure 7:
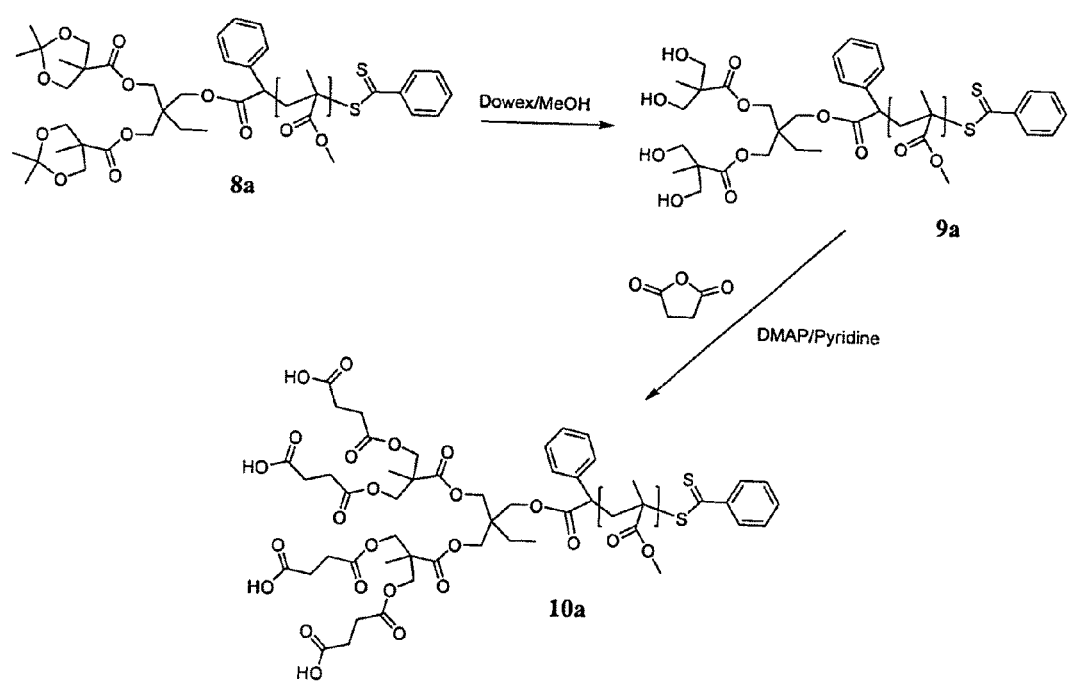
FIG. 7 shows a scheme for the synthesis of carboxy-terminated hybrid dendritic-linear block copolymers, 10a, by deprotection of the corresponding acetonide derivative, 8a, followed by functionalization with maleic anhydride.

General Methods. Analytical TLC was performed on commercial Merck Plates coated with silica gel GF254 (0.24 mm thick). Silica Gel for flash chromatography was Merck Kieselgel 60 (230-400 mesh, ASTM). $^1$H NMR (400 MHz) and $^{13}$C NMR (100 MHz) measurements were performed on a Bruker AC 200 spectrometer at room temperature. Size exclusion chromatography (SEC) was carried out at room temperature on a Waters chromatograph connected to a Waters 410 differential refractometer and six Waters Styragel® columns (five HR-5 µm and one HMW-20 µm) using THF as eluent (flow rate: 1 mL/min). A Waters 410 differential refractometer and a 996 photodiode array detector were employed. The molecular weights of the polymers were calculated relative to linear polystyrene standards. The viscosity was measured with a TA ARES rheometer with ausing a coquette test setup with 34 mm Ø cup and a 32 mm Ø bob of 33.3 mm. The experiments were run 1 10 1/s at 25° C. for 30 s at both clockwise and counter clockwise rotation. A low viscous silicon oil (DMS-T05, 5.00 cSt) from Geleste Inc. was drizzled over the top of the sample to avoid evaporation of the solvent during measurement. Dynamic light scattering (DLS) analysis was carried out by BI-9000AT Digital autocorrelator with BI-APD Avalanche photodiode detector (Brookhaven Instruments Ltd., NY) equipped with 10 mW HeNe laser with power module. The samples were diluted to 0.5% of the original concentration for the DLS measurements to avoid multiple scattering effect. The intensity correlation functions were collected at 5 different angles (30, 60, 90, 110, and 130 degrees). A sum of two exponentials was then fitted to the intensity correlation function as seen in FIG. 7 and the decay rates were obtained from the fit (P2 and P4). Using a sum of two exponentials will lead to two different modes, corresponding to two different size distributions of particles. This was done since the particle size distribution is very large and the fit is much better than with only a single exponential function. The decay rates are then plotted against the scattering vector, q. The data should all fit on a straight line and the slope of this line is the diffusion coefficient which can be used to calculate the hydrodynamic radius of the particles by the Stoke-Einstein equation. TEM samples were prepared by evaporating a drop of solution diluted to ~5% onto a carbon coated grid, and samples were analyzed on a FEI T20 at 200 keV.

EXAMPLE 1

General Procedure for the Production of Dendritic Macroinitiators

Materials

Cu(PPh$_3$)$_3$, acetonide protected bis-MPA, 4-(dimethylamino)pyridinium-p-toluenesulfonate (DPTS), and 4-azidobutanoic acid were synthesized according to previous described procedures. The nanoparticles (TTO-51(A), TTO-51N) were obtained from Ishihara Sangyo Kaisha Ltd. All other reagents were obtained from Aldrich and used as received.

Acetonide-2,2-bis(methylol) propanol. To a stirred solution of trimethylolpropane (TMP) (50.0 g, 373 mmol) in acetone (1000 ml) was added p-toluene sulfonicacid (p-TSA) (1.39 g, 7.46 mmol) and 2,2-dimethylolpropane (58.2 g, 560 mmol). The reaction was stirred over night and quenched with NH$_4$OH/ethanol (50/50 v/v) and the acetone evaporated. The crude product was dissolved in CH$_2$Cl$_2$ (1000 ml), extracted 3 times with water (100 ml), dried with mgSO$_4$, and concentrated to yield a colorless oil (56.5 g, 87%). $^1$H NMR (CDCl$_3$): δ0.79 (t, CH$_2$CH$_3$, J=7.6 Hz, 3H), 1.30 (q, CH$_2$CH$_3$, J=7.6 Hz, 2H), 1.38 (s, CCH$_3$, 3H), 1.41 (s, CCH$_3$, 3H), 2.70 (t, —OH, J=7.4 Hz, 1H), 3.54 (s, CH$_2$OH, 2H), 3.65 (s, CH$_2$O, 2H), 3.68 (s, CH$_2$O, 2H). $^{13}$C NMR (CDCl$_3$): δ7.00 (s, CH$_2$CH$_3$, 1C), 20.17 (s, CH$_2$CH$_3$, 1C), 23.74 (s, CCH$_3$, 1C), 27.30 (s, CCH$_3$, 1C), 36.91 (s, C(CH$_2$)$_4$, 1C), 62.51 (s, CH$_2$OH, 1C), 65.15 (s, CH$_2$O, 2C), 98.16 (s C(CH$_3$)$_2$, 1C).

(Acetonide-2,2-bis(methylol) propyl)-2-bromo-2-phenylacetate. To a solution of 2,2-bis(methylol) propanol (5.00 g, 28.7 mmol), α-bromophenylacetic acid (7.42 g, 34.5 mmol), and DPTS (1.69 g, 5.70 mmol) in CH$_2$Cl$_2$ (25 mL) was added dropwise a solution of N,N'-dicyclohexylcarbodiimide (DCC) (8.90 g, 43.1 mmol) in CH$_2$Cl$_2$ (25 mL). The reaction mixture was stirred at room temperature for 24 hours, filtered and the crude product purified by column chromatography, eluting from hexane to 10:90 ethyl acetate:hexane, to give the pure product as a colorless oil (7.80 g, 73%). $^1$H NMR (CDCl$_3$): δ0.76 (t, CH$_2$CH$_3$, J=7.6 Hz, 3H), 1.24 (q, CH$_2$CH$_3$, J=7.6 Hz, 2H), 1.37 (s, CCH$_3$, 3H), 1.40 (s, CCH$_3$, 3H), 3.57 (s, CH$_2$O, 4H), 4.29 (s, CH$_2$OOC, 2H), 5.37 (s, Br—CHAr, 1H), 7.29-7.55 (m, o, m, p-ArH, 5H), $^{13}$C NMR (CDCl$_3$): δ 6.91 (s, CH$_2$CH$_3$, 1C), 20.50 (s, CH$_2$CH$_3$, 1C), 23.81 (s, CCH$_3$, 1C), 26.88 (s, CCH$_3$, 1C), 36.22 (s, C(CH$_2$)$_4$, 1C), 46.95 (s, CHBr, 1C), 64.91 (s, CH$_2$O, 2C), 65.81 (s, CH$_2$OOC, 1C), 98.29 (s C(CH$_3$)$_2$, 1C), 128.65-129.31 (3 s, ArC, 5C), 135.77 (s, ArCCHBr, 1C), 168.06 (s, COOCH$_2$, 1C).

(Acetonide-2,2-bis(methylol) propyl)-2-phenyl-2-(phenylcarbonothioyl)thioacetate (Acetonide-G1-RAFT). Carbon disulfide (5.00 mL, 82.8 mmol) was added dropwise to a solution of phenylmagnesium bromide (3.0 M in diethyl ether, 12.0 mL, 33.1 mmol) in 100 mL of dry tetrahydrofuran. The mixture was allowed to stir at 50° C. to form a dark brown solution and a solution (2,2-bis(methylol) propyl)-2-bromo-2-phenylacetate (10.2 g, 27.6 mmol) in 20 mL of dry THF was then added. The reaction mixture was heated to 80° C. for 24 h, the solvent evaporated onto silica gel and the crude product purified by column chromatography, eluting with hexane gradually increasing to 7.5:92.5 ethyl acetate:hexane, to give the generation 1, RAFT agent as a red oil (6.80 g, 55%). $^1$H NMR (CDCl$_3$): δ0.74 (t, CH$_2$CH$_3$, J=7.6 Hz, 3H), 1.27 (q, CH$_2$CH$_3$, J=6.0 Hz, 2H), 1.36 (s, CCH$_3$, 3H), 1.39 (s, CCH$_3$, 3H), 3.61 (m, CH$_2$O, 4H), 4.27 (m, CH$_2$COO, 2H), 5.76 (s, PhCH, 1H), 7.27-7.50 (m, m, p-ArHCSS and o, m, p-Ar, 8H), 7.99 (dd, J=7.4 Hz, o-ArHCSS, 2H). $^{13}$C NMR (CDCl$_3$): $^{13}$C NMR (CDCl$_3$): δ 7.01 (s, CH$_2$CH$_3$, 1C), 21.11 (s, CH$_2$CH$_3$, 1C), 23.85 (s, CCH$_3$, 1C), 26.37 (s, CCH$_3$, 1C), 36.24 (s, C(CH$_2$)$_4$, 1C), 58.75 (s, CHSSCAr, 1C), 64.99 (s, CH$_2$O, 2C), 65.67 (s, CH$_2$OOC, 1C), 98.28 (s C(CH$_3$)$_2$, 1C), 126.98-132.88 (6 s, ArC, 10C), 133.51 (s, ArCCHS, 1C), 144.01 (s, ArCCSS, 1C), 168.78 (s, COOCH$_2$, 1C).

EXAMPLE 2

General Procedure for Deprotection of Acetonide Protecting Groups—the Production of 2,2-Bis(Methylol) Propyl)-2-Phenyl-2-(Phenylcarbonothioyl)Thioacetate (OH-G1-RAFT)

To a stirred solution of Acetonide-G1-RAFT (5.00 g, 11.2 mmol) in 300 ml of MeOH was added DOWEX, 50×200 resin (10.0 g). The reaction was allowed to stir at 50° C. for 8 h, the resin was filtered, and the organic phase concentrated to give HO-G1-RAFT as a red oil which was essentially pure and did not require further purification (4.13 g, 91%). $^1$H NMR (CDCl$_3$): δ 0.84 (t, CH$_2$CH$_3$, J=6.4 Hz, 3H), 1.22 (q, CH$_2$CH$_3$, J=7.0 Hz, 2H), 3.24 (t, OH, J=7.0 Hz, 2H), 3.51 (m, CH$_2$OH, 4H), 4.19 (q, CH$_2$OOC, J=7.0 Hz, 2H), 5.74 (s, PhCH, 1H), 7.27-7.52 (m, m, p-ArHCSS and o, m, p-Ar, 8H) 7.98 (dd, J=7.2 Hz, o-ArHCSS, 2H). $^{13}$C NMR (CDCl$_3$): $^{13}$C NMR (CDCl$_3$): δ 7.30 (s, CH$_2$CH$_3$, 1C), 22.18 (s, CH$_2$CH$_3$, 1C), 29.67 (s, C(CH$_2$)$_4$, 1C), 58.96 (s, CHSSCAr, 1C), 64.88 (s, CH$_2$OH, 2C), 65.92 (s, CH$_2$OOC, 1C), 126.88-132.94 (6 s, ArC, 10C), 133.03 (s, ArCCHS, 1C), 143.76 (s, ArCCSS, 1C), 169.56 (s, COOCH$_2$, 1C).

HO-G2-RAFT. Red sticky solid (87%). $^1$H NMR (MeOD): δ0.83 (t, CH$_2$CH$_3$, J=7.6 Hz, 3H), 1.08 (s, CCH$_3$, 6H), 1.42 (q, CH$_2$CH$_3$, J=7.2 Hz, 2H), 3.22 (s, OH, J=7.0 Hz, 4H), 4.27 (m, CH$_2$COO, 2H, and CH$_2$O, 4H), 5.73 (s, PhCH, 1H), 7.20-7.55 (m, m, p-ArHCSS and o, m, p-Ar, 8H), 7.96 (dd, J=7.4 Hz, o-ArHCSS, 2H). $^{13}$C NMR (MeOD): δ 6.45 (s, CH$_2$CH$_3$, 1C), 16.13 (s, CCH$_3$, 2C), 22.46 (s, CH$_2$CH$_3$, 1C), 41.31 (s, C(CH$_2$)$_4$, 1C), 50.31 (s, CCH$_2$OH, 2C) 58.88 (s, CHSSCAr, 1C), 63.04 (s, CH$_2$O, 2C), 64.48 (s, CCH$_2$OH, 4C), 64.79 (s, CH$_2$OOC, 1C), 126.56-129.05 (6 s, ArC, 10C), 132.96 (s, ArCCHS, 1C), 143.87 (s, ArCCSS, 1C), 168.49 (s, COOCH$_2$, 1C), 174.70 (s, COO, 2C).

EXAMPLE 3

General Procedure for Dendritic Growth with Acetonide Protected Groups—the Production of Acetonide-2,2-Bis(Methoxy) Propionic Acid (Acetonide-G2-RAFT)

To a stirred solution of HO-G1-RAFT (0.60 g, 1.48 mmol), DMAP (72 mg, 0.59 mmol, 0.2 eq/OH.) and pyridine (11.7 g, 14.8 mmol, 5 eq/OH) in CH$_2$Cl$_2$ (10 mL) was added Acetonide-2,2-bis(methoxy)propanoic anhydride (1.47 g, 4.45 mmol, 1.5 eq/OH.) and the reaction mixture stirred overnight at room temperature under argon. The residual anhydride was quenched by reaction with approximately 10 mL of water under rigorous stirring for 2 hours. The reaction mixture was then taken up into approximately 150 ml of dichloromethane and extracted 3 times with NaHSO$_4$ (50 mL), 3 times with of NaHCO$_3$ (50 mL), and finally once with brine (50 mL). The organic layer was dried with MgSO$_4$, the solvent was evaporated, and the crude product was purified by flash chromatography eluting with hexane gradually increasing to 25/85 ethyl acetate/hexane to give the second generation derivative, 8a, as a red sticky solid (0.94 g, 89%). $^1$H NMR (CDCl$_3$): δ0.83 (t, CH$_2$CH$_3$, J=6.2 Hz, 3H), 1.10 (s, CCH$_3$, 6H), 1.32 (s, CCH$_3$, 6H), 1.39 (s, CCH$_3$, 6H), 1.44 (q, CH$_2$CH$_3$, J=6.0 Hz, 2H), 3.59 (m, CH$_2$O, 4H), 4.27 (m, CH$_2$COO, 2H, CH$_2$O, 4H, and CH$_2$O, 4H), 5.69 (s, PhCH, 1H), 7.29-7.50 (m, m, p-ArHCSS and o, m, p-Ar, 8H), 7.97 (dd, J=7.0 Hz, o-ArHCSS, 2H). $^{13}$C NMR (CDCl$_3$): δ 7.31 (s, CH$_2$CH$_3$, 1C), 18.27 (s, CCH$_3$, 2C), 21.18 (s, CH$_2$CH$_3$, 1C), 23.23 (s, CCH$_3$, 2C), 26.07 (s, CCH$_3$, 2C), 41.58 (s, C(CH$_2$)$_4$, 1C), 42.16 (s, CCH$_2$O, 2C), 58.82 (s, CHSSCAr, 1C), 63.18 (s, CH$_2$O, 2C), 64.83 (s, CCH$_2$OH, 4C), 65.93 (s, CH$_2$OOC, 1C), 98.13 (s C(CH$_3$)$_2$, 1C), 126.85-132.94 (6 s, ArC, 10C), 132.94 (s, ArCCHS, 1C), 143.77 (s, ArCCSS, 1C), 168.26 (s, COOCH$_2$, 10), 174.12 (s, COO, 2C).

Acetonide-G3-RAFT. Purified by MPLC using hexane gradually increasing to 40/60 ethyl acetate/hexane giving product as a red sticky solid (88%). $^1$H NMR (CDCl$_3$): δ0.82 (t, CH$_2$CH$_3$, J=6.2 Hz, 3H), 1.12 (s, CCH$_3$, 12H), 1.34 (s, CCH$_3$, 12H), 1.40 (s, CCH$_3$, 12H), 1.45 (q, CH$_2$CH$_3$, J=6.0 Hz, 2H), 3.58 (m, CH$_2$O, 8H), 4.00-4.30 (m, CH$_2$COO, 2H, CH$_2$O, 4H, CH$_2$O, 8H, and CH$_2$O, 8H), 5.68 (s, PhCH, 1H), 7.30-7.50 (m, m, p-ArHCSS and o, m, p-Ar, 8H), 7.99 (dd, J=7.0 Hz, o-ArHCSS, 2H). $^{13}$C NMR (CDCl$_3$): δ 7.44 (s, CH$_2$CH$_3$, 1C), 17.83 (s, CCH$_3$, 2C), 18.62 (s, CCH$_3$, 4C), 21.23 (s, CH$_2$CH$_3$, 1C), 22.12 (s, CCH$_3$, 4C), 25.36 (s, CCH$_3$, 4C), 41.58 (s, C(CH$_2$)$_4$, 1C), 42.16 (s, CCH$_2$O, 4C), 47.03 (s, CCH$_2$O, 2C), 58.93 (s, CHSSCAr, 1C), 63.98 (s, CH$_2$O, 2C), 64.94 (s, CCH$_2$OH, 4C), 66.05 (s, CCH$_2$OH, 8C) 66.11 (s, CH$_2$OOC, 1C), 98.23 (s C(CH$_3$)$_2$, 1C), 127.08-129.35 (6 s, ArC, 10C), 133.08 (s, ArCCHS, 1C), 143.93 (s, ArCCSS, 1C), 168.29 (s, COOCH$_2$, 1C), 172.09 (s, COO, 2C), 173.61 (s, COO, 4C).

EXAMPLE 4

General Procedure for Polymerization—the Production of Acetonide-G1-PMMA

Acetonide-G1-RAFT (890 mg, 2.00 mmol), AIBN (33 mg, 0.20 mμmol) was dissolved in neat MMA (5.00 g, 49.9 mmol) in a glass tube. The tube were degassed by freeze-pump-thaw cycles and sealed off under vacuum. The polymerization was run at 70° C. for 2 hrs hours and then cooled. The crude polymer was purified by MPLC using hexane gradually increasing to ethyl acetate giving product as a pink solid. Conversion was evaluated by $^1$H NMR of the crude polymer solution, and the molecular weight and polydispersity index were determined by SEC (yield=67%, M$_n$=5000 g/mol, PDI=1.21) $^1$H NMR δ0.55 (t, CH$_2$CH$_3$) 0.8-2.1 (broad m, PMMA CH, CH$_2$, CH$_3$), 1.11 (s, CCH$_3$) 1.32 (s, CCH$_3$), 3.1-3.8 (broad m, CH$_2$O, PMMA OCH$_3$), 3.9-4.1 (CH$_2$COO), 7.25-7.50 (m, m, p-ArHCSS and o, m, p-Ar,), 8.0 (dd, J=7.4 Hz, o-ArHCSS) $^{13}$C NMR (CDCl$_3$): δ 7.12, 16.34, 18.35, 21.03, 42.10, 44.43, 44.78, 45.43, 51.77, 52.67, 54.28, 60.31, 64.27, 65.93, 97.98, 126.62, 128.28, 173.52, 176.90, 177.75, 178.33.

Acetonide-G2-PMMA. $^1$H NMR (CDCl$_3$) δ0.7-2.1 (broad m, PMMA CH, CH$_2$, CH$_3$), 1.11 (s, CCH$_3$) 1.32 (s, CCH$_3$), 3.1-3.8 (broad m, CH$_2$O, PMMA OCH$_3$), 3.9-4.1 (m, CH$_2$COO and CH$_2$O), 7.25-7.50 (m, m, p-ArHCSS and o, m, p-Ar,), 8.0 (dd, J=7.4 Hz, o-ArHCSS). $^{13}$C NMR (CDCl$_3$): δ 7.09, 14.15, 16.32, 18.35, 21.00, 42.00, 44.43, 44.78, 45.43, 51.77, 52.67, 54.28, 60.31, 64.27, 65.93, 97.98, 126.62, 128.28, 173.52, 176.90, 177.75, 178.33.

Acetonide-G3-PMMA. $^1$H NMR (CDCl$_3$) δ0.7-2.1 (broad m, PMMA CH, CH$_2$, CH$_3$), 1.12 (s, CCH$_3$) 1.34 (s, CCH$_3$), 3.1-3.8 (broad m, CH$_2$O, PMMA OCH$_3$), 3.9-4.1 (m, CH$_2$COO, and CH$_2$O,), 7.25-7.50 (m, m, p-ArHCSS and o, m, p-Ar,), 8.0 (dd, J=7.4 Hz, o-ArHCSS). $^{13}$C NMR (CDCl$_3$): δ 7.13, 14.14, 17.06, 17.58, 18.38, 20.99, 21.84, 25.25, 30.88, 41.95, 42.10, 44.41, 45.41, 46.77, 54.31, 60.29, 64.67, 65, 88, 98.13, 126.60, 128.27, 144.73, 173.39, 177.03, 177.77, 178.02.

Acetonide-G4-PMMA. $^1$H NMR (CDCl$_3$) δ0.7-2.1 (broad m, PMMA CH, CH$_2$, CH$_3$), 1.10 (s, CCH$_3$) 1.33 (s, CCH$_3$), 3.1-3.8 (broad m, CH$_2$O, PMMA OCH$_3$), 3.9-4.1 (m, CH$_2$COO, and CH$_2$O,), 7.25-7.50 (m, m, p-ArHCSS and o, m, p-Ar,), 8.0 (dd, J=7.4 Hz, o-ArHCSS). $^{13}$C NMR (CDCl$_3$): δ 7.11, 14.12, 17.06, 17.42, 17.93, 18.48, 20.87, 21.82, 25.25, 30.78, 41.92, 42.10, 44.39, 45.41, 54.31, 60.29, 64.69, 65.72, 98.16, 126.63, 128.27, 144.73, 173.39, 174.32, 177.03, 177.73, 178.32.

(HO)$_2$-G1-PMMA. Acetonides were deprotected according to general deprotection procedure except for that the polymer was dissolved in THF and as much MeOH was added without precipitating the polymer. The product was a pink solid (95%). $^1$H NMR δ 0.8-2.1 (broad m, PMMA CH, CH$_2$, CH$_3$), 3.1-3.8 (broad m, PMMA OCH$_3$), 3.9-4.1 (m, CH$_2$OH, CH$_2$COO), 7.25-7.50 (m, m, p-ArHCSS and o, m, p-Ar,), 8.0 (dd, J=7.4 Hz, o-ArHCSS) $^{13}$C NMR (CDCl$_3$): δ 7.12, 16.38, 18.69, 21.02, 44.50, 44.84, 45.49, 51.82, 52.86, 54.38, 62.76, 126.68, 128.32, 128.74, 176.97, 177.81, 178.10.

(HO)$_4$-G2-PMMA. $^1$H NMR (CDCl$_3$) δ 0.8-2.1 (broad m, PMMA CH, CH$_2$, CH$_3$), 3.1-3.8 (broad m, PMMA OCH$_3$), 3.9-4.1 (CH$_2$OH, CH$_2$COO, and CH$_2$O), 7.25-7.50 (m, m, p-ArHCSS and o, m, p-Ar,), 8.0 (dd, J=7.4 Hz, o-ArHCSS) $^{13}$C NMR (CDCl$_3$): δ7.01, 16.32, 17.08, 18.64, 26.68, 30.01, 44.46, 44.81, 45.46, 49.72, 51.80, 52.83, 54.31, 58.54, 62.63, 67.68, 72.73, 126.65, 128.30, 175.14, 176.94, 177.79, 178.08, 178.36.

(HO)$_8$-G3-PMMA. $^1$H (CDCl$_3$) NMR δ 0.8-2.1 (broad m, PMMA CH, CH$_2$, CH$_3$), 3.1-3.8 (broad m, PMMA OCH$_3$), 3.9-4.1 (m, CH$_2$OH, CH$_2$COO, and CH$_2$O), 7.25-7.50 (m, m, p-ArHCSS and o, m, p-Ar,), 8.0 (dd, J=7.4 Hz, o-ArHCSS) $^{13}$C NMR (CDCl$_3$): δ 7.21, 16.33, 17.08, 17.94, 18.64, 20.98, 26.62, 29.97, 44.45, 44.80, 45.45, 46.51, 49.83, 51.80, 52.70, 54.35, 58.53, 58.90, 62.57, 64.69, 66.61, 72.72, 126.64, 127.67, 128.29, 132.48, 144.77, 172.46, 174.91, 176.93, 177.09, 178.08, 178.36.

Acetonide-G1-P(Bz-TEMA). $^1$H NMR (CDCl$_3$) δ0.3-2.1 (broad m, P(Bz-TEMA)), 1.12 (s, CCH$_3$), 1.34 (s, CCH$_3$), 2.2-2.6 (broad s, P(Bz-TEMA)), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 13.86, 17.02, 18.78, 19.38, 29.12, 29.25, 36.26, 36.33, 44.80, 45.16, 54.14, 63.80, 126.74, 127.26, 128.67, 128.97, 137.96, 176.38, 177.12, 177.96.

Acetonide-G2-P(Bz-TEMA). $^1$H NMR (CDCl$_3$) δ0.3-2.1 (broad m, P(Bz-TEMA)), 1.12 (s, CCH$_3$), 1.34 (s, CCH$_3$), 2.2-2.6 (broad s, P(Bz-TEMA)), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 16.92, 18.68, 19.37, 29.11, 29.11, 29.24, 36.25, 36.32, 44.80, 45.16, 63.78, 127.25, 128.66, 128.96, 137.95, 176.33, 177.10, 177.46.

Acetonide-G3-P(Bz-TEMA). $^1$H NMR (CDCl$_3$) δ0.3-2.1 (broad m, P(Bz-TEMA)), 1.12 (s, CCH$_3$), 1.34 (s, CCH$_3$), 2.2-2.6 (broad s, P(Bz-TEMA)), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 16.98, 18.53, 19.37, 29.11, 29.25, 36.25, 26.32, 42.05, 44.81, 45.16, 54.17, 63.80, 65.95, 98.12, 127.25, 128.66, 128.96, 137.96, 138.30, 176.38, 177.11, 177.45.

(HO)$_2$-G1-P(Bz-TEMA). $^1$H NMR (CDCl$_3$) δ0.3-2.1 (broad m, P(Bz-TEMA)), 1, 2.2-2.6 (broad s, P(Bz-TEMA)), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS).

(HO)$_4$-G2-P(Bz-TEMA). $^1$H NMR (CDCl$_3$) δ0.3-2.1 (broad m, P(Bz-TEMA)), 1, 2.2-2.6 (broad s, P(Bz-TEMA)), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS).

(HO)$_8$-G3-P(Bz-TEMA). $^1$H NMR (CDCl$_3$) δ0.3-2.1 (broad m, P(Bz-TEMA)), 1, 2.2-2.6 (broad s, P(Bz-TEMA),), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS).

(HOOC)$_2$-G1-P(Bz-TEMA). $^1$H NMR (CDCl$_3$) δ0.3-2.1 (broad m, P(Bz-TEMA)), 1, 2.2-2.6 (broad s, P(Bz-TEMA), CH$_2$CH$_2$COOH), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 17.00, 18.78, 19.37, 29.10, 29.23, 30.35, 36.24, 36.31, 44.80, 45.15, 54.11, 63.81, 127.26, 128.96, 137.95, 176.37, 177.34, 177.47.

(HOOC)$_4$-G2-P(Bz-TEMA). $^1$H NMR (CDCl$_3$) δ0.3-2.1 (broad m, P(Bz-TEMA)), 1, 2.2-2.6 (broad s, P(Bz-TEMA), CH$_2$CH$_2$COOH), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 16.90, 18.68, 29.11, 29.24, 30.35, 36.32, 44.80, 45.12, 54.16, 63.79, 127.26, 128.67, 128.96, 138.00, 176.38, 177.32, 177.47.

(HOOC)$_8$-G3-P(Bz-TEMA). $^1$H NMR (CDCl$_3$) δ0.3-2.1 (broad m, P(Bz-TEMA)), 1, 2.2-2.6 (broad s, P(Bz-TEMA), CH$_2$CH$_2$COOH), 3.1-4.2 (broad m, CH$_2$O, CH$_2$COO P(Bz-TEMA)), 6.7-7.50 (m, m, p-ArHCSS and o, m, p-Ar, P(Bz-TEMA)), 8.0 (dd, J=7.4 Hz, o-ArHCSS). $^{13}$C NMR (CDCl$_3$): δ 16.93, 28.41, 29.15, 29.58, 30.33, 36.29, 44.78, 45.11, 51.83, 63.78, 124.20, 127.20, 128.65, 128.95, 137.95, 175.84, 177.12, 177.47.

Acetonide-G2-P(FA513-MS). $^1$H NMR (CDCl$_3$) δ0.3-2.4 (broad m, P(FA513-MS)), 1.12 (s, CCH$_3$), 1.34 (s, CCH$_3$), 3.5-4.3 (m, CH$_2$O, CH$_2$COO), 4.3-4.5 (broad s, P(FA513-MS)) 7.25-7.50 (m, m, p-ArHCSS and o, m, p-Ar,), 8.0 (dd, J=7.4 Hz, o-ArHCSS). $^{13}$C NMR (CDCl$_3$): δ 17.34, 18.27, 27.74, 29.49, 31.75, 32.00, 38.03, 39.50, 42.96, 45.06, 45.48, 47.44, 53.44, 124.81, 128.30, 176.60, 177.31, 177.60.

(HO)$_4$-G2-P(FA513-MS). $^1$H NMR (CDCl$_3$) δ0.3-2.4 (broad m, P(FA513-MS)), 3.5-4.3 (m, CH$_2$O, CH$_2$COO), 4.3-4.5 (broad s, P(FA513-MS)) 7.25-7.50 (m, m, p-ArHCSS and o, m, p-Ar,), 8.0 (dd, J=7.4 Hz, o-ArHCSS). $^{13}$C NMR (CDCl$_3$): δ 18.45, 27.75, 29.44, 31.75, 32.01, 37.94, 39.49, 42.95, 45.07, 45.46, 47.43, 67.96, 177.28.

(HOOC)$_4$-G2-P(FA513-MS). $^1$H NMR (CDCl$_3$) δ0.3-2.4 (broad m, P(FA513-MS)), 2.3-2.5 (broad s, CH$_2$CH$_2$COOH) 3.5-4.3 (m, CH$_2$O, CH$_2$COO), 4.3-4.5 (broad s, P(FA513-MS)) 7.25-7.50 (m, m, p-ArHCSS and o, m, p-Ar,), 8.0 (dd, J=7.4 Hz, o-ArHCSS).

Acetonide-G2-PS. $^1$H NMR δ0.55 (t, CH$_2$CH$_3$) 0.7-2.3 (broad m, PS CH, CH$_2$), 1.11 (s, CCH$_3$) 1.32 (s, CCH$_3$), 3.5-4.3 (m, CH$_2$O, CH$_2$COO), 6-7.50 (m, m, p-ArHCSS and o, m, p-Ar, PS NH), 8.0 (dd, J=7.4 Hz, o-ArHCSS) $^{13}$C NMR (CDCl$_3$): δ 18.48, 40.39, 44.22, 66.01, 68.02, 98.11, 125.68, 127.69, 128.00, 145.31.

(HO)$_4$-G2-PS. $^1$H NMR δ0.55 (t, CH$_2$CH$_3$) 0.7-2.3 (broad m, PS CH, CH$_2$), 3.5-4.3 (m, CH$_2$O, CH$_2$COO), 6-7.50 (m, m, p-ArHCSS and o, m, p-Ar, PS ArH), 8.0 (dd, J=7.4 Hz, o-ArHCSS) $^{13}$C NMR (CDCl$_3$): δ25.64, 30.35, 40.43, 68.01, 125.66, 127.68, 127.99, 145.22.

(HOOC)$_4$-G2-PS. $^1$H NMR δ0.55 (t, CH$_2$CH$_3$) 0.7-2.3 (broad m, PS CH, CH$_2$), 2.3-2.5 (broad s, CH$_2$CH$_2$COOH), 3.5-4.3 (m, CH$_2$O, CH$_2$COO), 6-7.50 (m, m, p-ArHCSS and o, m, p-Ar, PS ArH), 8.0 (dd, J=7.4 Hz, o-ArHCSS) $^{13}$C NMR (CDCl$_3$): δ 40.47, 44.23, 45.94, 125.59, 126.28, 127.73, 128.05, 145.18, 145.71.

EXAMPLE 5

General Procedure for Functionalizing with Carboxylic Acids—the Production of (HOOC)$_2$-G1-PMMA To a stirred solution of HO-G1-PMMA (1.45 g, 0.29 mmol), DMAP (14 mg, 0.06 mmol, 0.2 eq/OH.) and pyridine (0.23 g, 2.90 mmol, 5 eq/OH) in 10 mL of CH$_2$Cl$_2$ was added Succinic anhydride (0.29 g, 2.90 mmol, 5 eq/OH.) The reaction was stirred overnight at RT. The residual anhydride was quenched by reaction with approximately 10 mL of water under rigorous stirring for a couple of hours. The reaction mixture was then taken up into approximately 150 ml of dichloromethane and extracted 3 times with NaHSO$_4$ (50 mL) and 3 times with brine (50 mL). The organic layer was dried with MgSO$_4$, the solvent was evaporated, and the crude product was dissolved in a small amount of CH$_2$Cl$_2$, precipitated into hexane, filtered, and dried to yield the product as a pink solid (94%). $^1$H NMR (CDCl$_3$) δ 0.8-2.1 (broad m, PMMA CH, CH$_2$, CH$_3$), 2.3-2.5 (broad s, CH$_2$CH$_2$COOH) 3.1-3.8 (broad m, PMMA OCH$_3$), 3.9-4.1 (m, CH$_2$O, CH$_2$COO), 7.25-7.50 (m, m, p-ArHCSS and o, m, p-Ar,), 8.0 (dd, J=7.4 Hz, o-ArHCSS) $^{13}$C NMR (CDCl$_3$): δ 11.42, 14.11, 16.37, 18.68, 20.68, 22.63, 25.25, 29.03, 31.56, 34.49, 34.63, 44.49, 44.83, 45.48, 51.81, 52.70, 54.37, 126.66, 128.31, 176.95, 177.81, 178.09.

(HOOC)$_4$-G2-PMMA. $^1$H NMR (CDCl$_3$) δ 0.8-2.1 (broad m, PMMA CH, CH$_2$, CH$_3$), 2.3-2.5 (broad s, CH$_2$CH$_2$COOH) 3.1-3.8 (broad m, PMMA OCH$_3$), 3.9-4.1 (m, CH$_2$O, CH$_2$COO), 7.25-7.50 (m, m, p-ArHCSS and o, m, p-Ar,), 8.0 (dd, J=7.4 Hz, o-ArHCSS). $^{13}$C NMR (CDCl$_3$): δ 11.42, 14.11, 14.31, 16.36, 18.74, 16.36, 18.74, 20.43, 20.68, 22.64, 25.25, 28.83, 31.57, 34.64, 36.05, 41.32, 44.51, 44.85, 46.46, 51.81, 52.71, 54.40, 126.68, 128.32, 171.37, 176.97, 177.81, 178.10.

(HOOC)$_8$-G3-PMMA. $^1$H NMR (CDCl$_3$) δ 0.8-2.1 (broad m, PMMA CH, CH$_2$, CH$_3$), 2.3-2.5 (broad s, CH$_2$CH$_2$COOH) 3.1-3.8 (broad m, PMMA OCH$_3$), 3.9-4.1 (m, CH$_2$O, CH$_2$COO), 7.25-7.50 (m, m, p-ArHCSS and o, m, p-Ar,), 8.0 (dd, J=7.4 Hz, o-ArHCSS). $^{13}$C NMR (CDCl$_3$): δ 11.45, 14.13, 16.43, 17.58, 18.70, 20.70, 22.60, 25.27, 28.85, 29.05, 31.59, 34.66, 44.52, 44.86, 46.47, 51.84, 54.33, 128.34, 171.61, 171.99, 177.01, 177.43, 177.33, 178.12.

Thioctic anhydride. To a stirred solution of thioctic acid (5.00 g, 24.2 mmol) in dichloromethane (25 ml) was added 1,3-dicyclohexylcarbodiimide (DCC) (2.50 g, 12.1 mmol). The reaction mixture was stirred at room temperature over night, filtered and evaporated to dryness. After evaporation the product was obtained as a yellow solid. (4.7 g, 98%). $^1$H NMR (CDCl$_3$): δ1.1-2.0 (broad m, CH$_2$CH$_2$COO, CH$_2$CH$_2$CH$_2$COO, CH$_2$CHSS, CH$_2$CH$_2$SS, 14HH), 2.3-2.5 (m, CH$_2$CH$_2$COO CH$_2$CH$_2$SS, 6H), 3.0-3.3 (m, CH$_2$CH$_2$SS, 4H), 3.5 (m, CHSS, 2H). $^{13}$C NMR (CDCl$_3$). δ23.92 (s, CH$_2$CH$_2$COO, 2C), 28.45 (s, CH$_2$CH$_2$CH$_2$COO, 2C), 34.57 (s, CH$_2$CH$_2$COO, 2C), 35.10 (s, CH$_2$CHSS, 2C), 38.50 (s, CH$_2$CH$_2$SS, 2C), 40.22 (s, CH$_2$CH$_2$SS, 2C), 56.21 (s, CHSS, 2C), 169.21 (s, COO, 2C).

(Thioctic)$_4$-G2-PMMA. To a stirred solution of HO-G2-PMMA (1.00 g, 0.20 mmol), DMAP (20 mg, 0.08 mmol, 0.2 eq/OH.) and pyridine (0.32 g, 4.00 mmol, 5 eq/OH) in 10 mL of CH$_2$Cl$_2$ was added thioctic anhydride (1.58 g, 4.00 mmol, 5 eq/OH.) The reaction was stirred overnight at RT. The residual anhydride was quenched by reaction with approximately 10 mL of water under rigorous stirring for a couple of hours. The reaction mixture was then taken up into approximately 150 ml of dichloromethane and extracted 3 times with NaHSO$_4$ (50 mL) and 3 times with brine (50 mL). The organic layer was dried with MgSO$_4$, the solvent was evaporated, and the crude product was purified by flash chromatography eluting with 60/40 ethyl acetate/hexane gradually increasing to ethyl acetate, concentrated, dissolved in a small amount of CH$_2$Cl$_2$, precipitated into hexane, filtered, and dried to yield the product as a white solid (87%). $^1$H NMR (CDCl$_3$) δ 0.8-2.1 (broad m, PMMA CH, CH$_2$, CH$_3$, broad m, CH$_2$CH$_2$COO, CH$_2$CH$_2$CH$_2$COO, CH$_2$CHSS, CH$_2$CH$_2$SS), 2.3-2.5 (broad m, CH$_2$CH$_2$COO CH$_2$CH$_2$SS) 3.1-3.8 (broad m, PMMA OCH$_3$, CH$_2$CH$_2$SS, CHSS), 3.9-4.1 (m, CH$_2$O, CH$_2$COO). $^{13}$C NMR (CDCl$_3$): δ 11.42, 14.11, 16.42, 18.75, 22.64, 24.55, 25.27, 28.71, 29.05, 31.57, 34.65, 38.49, 40.24, 44.53, 44.88, 51.80, 54.45, 56.32, 172.43, 176.96, 177.78.

5-(dioctylphosphoryl)pentanoic acid. Di-n-octyl phosphine oxide (5.00 g, 18.2 mmol), 4-pentenoic acid (2.28 g, 22.8 mmol, 1.25 eq.) and AIBN (0.75 g, 4.6 mmol, 0.25 eq.) was mixed and deoxygenated by 3 freeze pump thaw cycles. The reaction was stirred under Ar over night at 80° C. The crude product was purified with flash chromatography eluting with ethyl acetate increasing to 5/95 methanol/ethyl acetate, concentrated and followed by flash chromatography eluting with chloroform gradually increasing to 10/90 methanol/chloroform. The crude product was obtained as colorless oil (3.76 g, 55%). $^1$H NMR (CDCl$_3$): δ0.89 (t, J=6.6 Hz, CH$_3$, 6H), 1.25-1.90 (broad m, octyl CH$_2$, PCH$_2$CH$_2$ and PCH$_2$CH$_2$, 32H), 2.34 (t, J=6.0 Hz, CH$_2$COO, 2H). $^{13}$C NMR (CDCl$_3$): δ14.08, 21.07, 21.57, 22.62, 26.50, 26.74, 27.82, 28.04, 29.05, 30.93, 31.21, 31.78, 33.83, 175.56. $^{31}$P NMR (CDCl$_3$): δ52.88.

5-(dioctylphosphoryl)pentanoic anhydride. To a stirred solution of 5-(dioctylphosphoryl)pentanoic acid (3.76 g, 10.1 mmol) in dichloromethane (20 ml) was added 1,3-dicyclohexylcarbodiimethane (DCC) (1.04 g, 5.05 mmol). The reaction mixture was stirred at room temperature over night, filtered and evaporated to dryness. The byproducts were isolated through precipitation into ether (20 ml) and filtration. After evaporation the product was obtained as a yellow solid. (3.19 g, 87%). $^1$H NMR (CDCl$_3$): δ 0.92 (t, J=6.4 Hz, CH$_3$, 12H), 1.20-1.95 (broad m, octyl CH$_2$, PCH$_2$CH$_2$ and PCH$_2$CH$_2$, 64H), 2.51 (t, J=6.8 Hz, CH$_2$COO, 4H). $^{13}$C NMR (CDCl$_3$): δ 14.05, 21.08, 21.74, 22.58, 25.41, 27.37, 28.26, 28.66, 29.06, 31.00, 31.75, 34.67, 34.89, 168.86. $^{31}$P NMR (CDCl$_3$): δ48.11.

(Phosphine oxide)$_4$-G2-PMMA. To a stirred solution of HO-G2-PMMA (0.5 g, 0.10 mmol), DMAP (2 mg, 0.04 mmol, 0.2 eq/OH.) and pyridine (0.16 g, 2.0 mmol, 5 eq/OH) in 10 mL of $CH_2Cl_2$ was added 5-(dioctylphosphouryl)pentanoic anhydride (1.46 g, 2.00 mmol, 5 eq/OH.) The reaction was stirred overnight at RT. The residual anhydride was quenched by reaction with approximately 5 mL of water under rigorous stirring for a couple of hours. The reaction mixture was then taken up into approximately 20 ml of dichloromethane and extracted 3 times with $NaHSO_4$ (20 mL) and 3 times with brine (20 mL). The organic layer was dried with $MgSO_4$, the solvent was evaporated, dissolved in a DMF (10 ml), filtered with a centriplus centrifugal filter (3000 MW cutoff), precipitated into water, filtered, dried, dissolved in a small amount of $CH_2Cl_2$, precipitated into hexane, filtered, and dried to yield the product as a white solid (0.10 g, 17%). $^1$H NMR ($CDCl_3$) δ 0.8-2.0 (broad m, PMMA CH, $CH_2$, $CH_3$, octyl $CH_2$, $PCH_2CH_2$ and $PCH_2CH_2$), 2.63 (t, J=7.2 Hz, $CH_2COO$) 3.1-3.8 (broad m, PMMA $OCH_3$), 3.9-4.1 (m, $CH_2O$, $CH_2COO$) $^{13}$C NMR ($CDCl_3$): δ 13.93, 16.31, 18, 62, 21.52, 22.45, 24.86, 28 89, 30.88, 31.15, 31.62, 44.36, 44.71, 51.64, 54.24, 176.77, 177.65, 177.93. $^{31}$P NMR ($CDCl_3$): δ48.70.

4-Azidobutanoic anhydride. To a stirred solution of 4-azidobutanoic acid (14.35 g, 111.1 mmol) in dichloromethane (50 ml) was added 1,3-dicyclohexylcarbodiimide (DCC) (11.46 g, 55.7 mmol). The reaction mixture was stirred at room temperature over night, filtered and evaporated to dryness. The byproducts were isolated through precipitation into ether (20 ml) and filtration. After evaporation the product was obtained as a colorless oil. (12.9 g, 97%). $^1$H NMR ($CDCl_3$): δ1.94 (quin, J=7.0 Hz, $CH_2CH_2$—$N_3$, 4H), 2.54 (t, J=7.0 Hz, $CH_2CH_2$—$N_3$, 4H), 3.40 (t, J=6.6 Hz, $CH_2COO$, 4H). $^{13}$C NMR ($CDCl_3$): δ23.54 (s, $CH_2CH_2$—$N_3$, 2C), 32.08 (s, $CH_2CH_2$—$N_3$, 2C), 50.15 (s, $CH_2COO$, 2C), 168.41 (s, $CH_2COO$, 2C).

EXAMPLE 6

General Procedure for Functionalizing with Azides—the Production of $(N_3)_2$-G1-PMMA To a stirred solution of HO-G1-PMMA (2.03 g, 0.41 mmol), DMAP (20 mg, 0.16 mmol, 0.2 eq/OH.) and pyridine (0.32 g, 4.1 mmol, 5 eq/OH) in 10 mL of $CH_2Cl_2$ was added 4-azidobutanoic anhydride (0.97 g, 4.10 mmol, 5 eq/OH.) The reaction was stirred overnight at RT. The residual anhydride was quenched by reaction with approximately 10 mL of water under rigorous stirring for a couple of hours. The reaction mixture was then taken up into approximately 150 ml of dichloromethane and extracted 3 times with $NaHSO_4$ (50 mL), 3 times with of $NaHCO_3$ (50 mL), and finally once with brine (50 mL). The organic layer was dried with $MgSO_4$, the solvent was evaporated, and the crude product was dissolved in a small amount of $CH_2Cl_2$, precipitated into hexane, filtered, and dried to yield the product as a pink solid (93%). $^1$H NMR ($CDCl_3$) δ 0.8-2.1 (broad m, $CH_2CH_2$—$N_3$, PMMA CH, $CH_2$, $CH_3$), 2.4 (t, $CH_2CH_2$—$N_3$,), 3.4 (t, $CH_2COO$,), 3.1-3.8 (broad m, PMMA $OCH_3$), 3.9-4.1 (m, $CH_2O$, $CH_2COO$), 7.25-7.50 (m, m, p-ArHCSS and o, m, p-Ar,), 8.0 (dd, J=7.4 Hz, o-ArHCSS) $^{13}$C NMR ($CDCl_3$): δ 14.22, 16.61, 18.82, 22.75, 31.96, 44.62, 44.97, 51.90, 54.56, 177.00, 177.91, 178.21.

$(N_3)_4$-G2-PMMA. $^1$H NMR ($CDCl_3$) δ 0.8-2.1 (broad m, $CH_2CH_2$—$N_3$, PMMA CH, $CH_2$, $CH_3$), 2.4 (t, $CH_2CH_2$—$N_3$,), 3.4 (t, $CH_2COO$,), 3.1-3.8 (broad m, PMMA $OCH_3$), 3.9-4.1 (m, $CH_2O$, $CH_2COO$), 7.25-7.50 (m, m, p-ArHCSS and o, m, p-Ar,), 8.0 (dd, J=7.4 Hz, o-ArHCSS) $^{13}$C NMR ($CDCl_3$): δ14.22, 18.86, 22.75, 24.40, 31.68, 44.62, 44.96, 50.58, 51.91, 177.91, 178.21.

$(N_3)_8$-G3-PMMA. $^1$H NMR ($CDCl_3$) δ 0.8-2.1 (broad m, $CH_2CH_2$—$N_3$, PMMA CH, $CH_2$, $CH_3$), 2.4 (t, $CH_2CH_2$—$N_3$,), 3.4 (t, $CH_2COO$,), 3.1-3.8 (broad m, PMMA $OCH_3$), 3.9-4.1 (m, $CH_2O$, $CH_2COO$), 7.25-7.50 (m, m, p-ArHCSS and o, m, p-Ar,), 8.0 (dd, J=7.4 Hz, o-ArHCSS) $^{13}$C NMR ($CDCl_3$): δ 14.19, 16.37, 17.83, 18.81, 22.72, 24.18, 30.90, 31.65, 44.60, 44.94, 50.56, 51.88, 54.47, 65.17, 172.18, 177.05, 177.88, 178.17.

EXAMPLE 7

General Procedure for Functionalizing with Phosphoric Acid—the Production of $(H_2PO_4)_4$-G2-PMMA To a stirred solution of propargyl phosphouric acid (174 mg, 1.28 mmol, 2 eq/$N_3$), $N_3$-G2-PMMA (800 mg, 0.16 mmol), and diisopropylethylamine (DIPEA) (410 mg, 3.2 mmol, 5 eq/$N_3$) in 1.5 ml of DMF was added Cu(PPh$_3$)$_3$ (15 mg, 0.016 mmol). The crude polymer was precipitated into hexane, filtered, dissolved in 10 ml of $CH_2Cl_2$, extracted three times with 1M HCl (5 mL), 3 times with of $NaHCO_3$ (5 mL), three times with 1M HCl (5 mL). The organics were dried with $MgSO_4$, evaporated dissolved in a small amount ml of $CH_2Cl_2$, precipitated into hexane, filtered, and dried to yield a pink solid (24%). $^1$H NMR (DMSO) δ 0.8-2.1 (broad m, $CH_2CH_2$—, PMMA CH, $CH_2$, $CH_3$), 2.4 (t, $CH_2CH_2$—), 3.4 (t, $CH_2COO$,), 3.1-3.8 (broad m, PMMA $OCH_3$), 3.9-4.1 (m, $CH_2O$, $CH_2COO$), 7.25-7.50 (m, m, p-ArHCSS and o, m, p-Ar,), 8.0 (dd, J=7.4 Hz, o-ArHCSS) $^{31}$P NMR (DMSO): δ −1.01, −1.31.

$(H_2PO_4)_8$-G3-PMMA. $^1$H NMR (DMSO) δ 0.8-2.1 (broad m, $CH_2CH_2$—, PMMA CH, $CH_2$, $CH_3$), 2.4 (t, $CH_2CH_2$—,), 3.4 (t, $CH_2COO$,), 3.1-3.8 (broad m, PMMA $OCH_3$), 3.9-4.1 (m, $CH_2O$, $CH_2COO$), 7.25-7.50 (m, m, p-ArHCSS and o, m, p-Ar,), 8.0 (dd, J=7.4 Hz, o-ArHCSS) $^{31}$P NMR (DMSO): δ −0.99, −1.33.

The invention claimed is:

1. A composition of hybrid dendritic-linear copolymers comprising: a compound of the general formula, $F_x$-[G-n]-$P_z$, where F is the chain end functional group of a macroinitiating dendrimer, x is the number of chain end functional groups, G is the dendrimer, n is the generation number of the dendrimer, P is the repeat unit of the linear polymer, and z is the number of repeat units of the linear polymer.

2. A process for producing hybrid dendritic-linear copolymers using living free radical polymerization comprising:
   performing polymerization of a vinyl monomer with a dendritic macroinitiator comprising the formula of $F_x$-[G-n]-I, where F is the chain end functional group of the dendrimer, x is the number of chain end functional groups, G is the dendrimer, n is the generation number of the dendrimer, and I is the initiating group for living free radical polymerization.

3. The process of claim 2, further comprising adding a polymerization initiator.

4. The hybrid dendritic-linear copolymers produced by claim 2.

5. The process of claim 2, further comprising deprotection and functionalization reactions.

6. The process of claim 5, wherein the functionalization reactions are either
   a) reactions with succinic anhydride to yield carboxylic hybrid dendritic-linear copolymers;
   b) esterification of the hydroxyl chain ends using anhydride chemistry to produce disulphide terminated hybrid dendritic-linear copolymers;

c) reactions with 5-(dioctylphosphoryl)pentanoic anhydride to produce phosphine oxide terminated hybrid dendritic-linear copolymers; or
d) Click reactions to produce phosphonic acid terminated hybrid dendritic-linear copolymers.

7. The process of claim 6 wherein the functionalization reactions are reactions with succinic anhydride to yield carboxylic hybrid dendritic-linear copolymers.

8. The process of claim 6 wherein the functionalization reactions are esterification reactions to yield disulphide terminated hybrid dendritic-linear copolymers.

9. The process of claim 6 wherein the functionalization reactions are reactions with 5-(dioctylphosphoryl)pentanoic anhydride to produce phosphine oxide terminated hybrid dendritic-linear copolymers.

10. The process of claim 6 wherein the functionalization reactions are click reactions to produce phosphonic acid terminated hybrid dendritic-linear copolymers.

* * * * *